US010417766B2

(12) United States Patent
Lim et al.

(10) Patent No.: US 10,417,766 B2
(45) Date of Patent: Sep. 17, 2019

(54) METHOD AND DEVICE FOR GENERATING METADATA INCLUDING FREQUENCY CHARACTERISTIC INFORMATION OF IMAGE

(71) Applicant: SAMSUNG ELECTRONICS CO., LTD., Suwon-si (KR)

(72) Inventors: Tae-gyu Lim, Seoul (KR); Il-koo Kim, Suwon-si (KR); Seung-hoon Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 131 days.

(21) Appl. No.: 15/526,607

(22) PCT Filed: Aug. 21, 2015

(86) PCT No.: PCT/KR2015/008740
§ 371 (c)(1),
(2) Date: May 12, 2017

(87) PCT Pub. No.: WO2016/076515
PCT Pub. Date: May 19, 2016

(65) Prior Publication Data
US 2017/0337691 A1 Nov. 23, 2017

Related U.S. Application Data

(60) Provisional application No. 62/079,239, filed on Nov. 13, 2014.

(51) Int. Cl.
*G06K 9/34* (2006.01)
*G06K 9/46* (2006.01)
(Continued)

(52) U.S. Cl.
CPC .............. *G06T 7/11* (2017.01); *G06K 9/6212* (2013.01); *G06K 9/6218* (2013.01); *G06T 7/168* (2017.01);
(Continued)

(58) Field of Classification Search
USPC .................... 382/173, 250, 286; 375/240.24; 348/420.1
See application file for complete search history.

(56) References Cited

U.S. PATENT DOCUMENTS 5,832,128 A * 11/1998 Suzuki ................... H04N 19/60
382/246
6,337,929 B1 * 1/2002 Kajiwara ............... G06T 9/004
382/239
(Continued)

FOREIGN PATENT DOCUMENTS

CN   1539239 A   10/2004
CN   1913639 A   2/2007
(Continued)

OTHER PUBLICATIONS

International Search Report (PCT/ISA/210) and Written Opinion (PCT/ISA/237) dated Nov. 16, 2015 issued by the International Searching Authority in counterpart International Application No. PCT/KR2015/008740.
(Continued)

*Primary Examiner* — Kathleen Y Dulaney
(74) *Attorney, Agent, or Firm* — Sughrue Mion, PLLC

(57) ABSTRACT

Provided are a method and device for generating metadata including frequency characteristic information of an image. Pixel values of a current block among blocks divided from the image are converted into frequency coefficients in the frequency domain. A band value of a frequency band corresponding to each of regions of the current block is deter-
(Continued)

mined using the frequency coefficients included in the regions of the current block, the regions of the current block being divided to correspond to different frequency bands. Metadata including the frequency characteristic information of the current block is generated based on the determined band values.

20 Claims, 19 Drawing Sheets

(51) Int. Cl.
| | | |
|---|---|---|
| *G06K 9/36* | (2006.01) | |
| *H04N 7/12* | (2006.01) | |
| *G06T 7/11* | (2017.01) | |
| *G06K 9/62* | (2006.01) | |
| *G06T 7/168* | (2017.01) | |
| *H04N 7/01* | (2006.01) | |
| *H04N 7/015* | (2006.01) | |
| *G06T 7/42* | (2017.01) | |

(52) U.S. Cl.
CPC ................ *G06T 7/42* (2017.01); *H04N 7/01* (2013.01); *H04N 7/015* (2013.01); *H04N 7/0127* (2013.01); *G06T 2207/20021* (2013.01); *G06T 2207/20052* (2013.01)

(56) References Cited

U.S. PATENT DOCUMENTS

| | | | | |
|---|---|---|---|---|
| 6,487,318 B1* | 11/2002 | Cho | ...................... | H04N 19/647 |
| | | | | 375/240.11 |
| 6,501,859 B1* | 12/2002 | Kajiwara | ............... | H04N 19/00 |
| | | | | 375/E7.049 |
| 6,693,965 B1* | 2/2004 | Inoue | ...................... | G06T 1/005 |
| | | | | 375/240.19 |
| 6,917,716 B2* | 7/2005 | Kajiwara | ............... | H04N 19/70 |
| | | | | 375/E7.053 |
| 6,944,349 B1* | 9/2005 | Onno | ...................... | G06F 17/148 |
| | | | | 239/248 |
| 7,355,755 B2* | 4/2008 | Suino | ...................... | G06K 15/02 |
| | | | | 358/1.9 |
| 8,064,718 B2 | 11/2011 | Pedersen | | |
| 8,200,044 B2* | 6/2012 | Callway | ................ | G06F 3/1415 |
| | | | | 348/448 |
| 8,204,331 B2 | 6/2012 | Fukuhara et al. | | |
| 8,295,625 B2* | 10/2012 | Gao | ...................... | H04N 19/176 |
| | | | | 375/240.01 |
| 8,320,693 B2* | 11/2012 | Fukuhara | ............. | H04N 19/647 |
| | | | | 382/240 |
| 8,432,967 B2* | 4/2013 | Hosaka | ................ | H04N 19/176 |
| | | | | 348/398.1 |
| 8,532,340 B2 | 9/2013 | Kruglick | | |
| 8,649,624 B2 | 2/2014 | Kim et al. | | |
| 8,861,865 B2 | 10/2014 | Jeong et al. | | |
| 9,485,523 B2 | 11/2016 | Lee et al. | | |
| 2002/0191695 A1 | 12/2002 | Irvine et al. | | |
| 2003/0231796 A1* | 12/2003 | Caviedes | ............. | H04N 19/176 |
| | | | | 382/239 |
| 2006/0039615 A1* | 2/2006 | Chen | ...................... | H04N 19/60 |
| | | | | 382/232 |
| 2007/0031049 A1 | 2/2007 | Kim | | |
| 2008/0050008 A1* | 2/2008 | Oaki | ...................... | G06T 7/001 |
| | | | | 382/144 |
| 2008/0181522 A1* | 7/2008 | Hosaka | .................. | H04N 19/63 |
| | | | | 382/251 |
| 2008/0285868 A1* | 11/2008 | Rai | ...................... | H04N 19/176 |
| | | | | 382/240 |
| 2008/0310503 A1 | 12/2008 | Lee et al. | | |
| 2009/0092326 A1* | 4/2009 | Fukuhara | ............. | H04N 19/139 |
| | | | | 382/233 |
| 2010/0034478 A1* | 2/2010 | Kajiwara | ............. | H04N 19/176 |
| | | | | 382/248 |
| 2010/0046626 A1* | 2/2010 | Tu | ........................ | H04N 19/176 |
| | | | | 375/240.18 |
| 2010/0158471 A1* | 6/2010 | Ogikubo | ............. | G06F 3/04845 |
| | | | | 386/278 |
| 2011/0274359 A1* | 11/2011 | Iwamoto | ................ | G06F 21/00 |
| | | | | 382/197 |
| 2012/0082343 A1* | 4/2012 | Schoeberl | ............ | H04N 19/172 |
| | | | | 382/103 |
| 2012/0141037 A1* | 6/2012 | Sato | ...................... | H04N 19/159 |
| | | | | 382/224 |
| 2012/0219057 A1* | 8/2012 | Takahashi | ............ | H04N 19/176 |
| | | | | 375/240.03 |
| 2014/0086480 A1* | 3/2014 | Luo | .......................... | G06K 9/66 |
| | | | | 382/156 |
| 2014/0254920 A1 | 9/2014 | Xu et al. | | |
| 2014/0369621 A1* | 12/2014 | Diggins | ................ | H04N 19/50 |
| | | | | 382/251 |
| 2015/0256843 A1* | 9/2015 | Roskowski | ........... | H04N 19/91 |
| | | | | 382/246 |
| 2017/0048482 A1* | 2/2017 | Drako | .................... | H04N 7/181 |

FOREIGN PATENT DOCUMENTS

| | | |
|---|---|---|
| CN | 101309415 A | 11/2008 |
| CN | 101682773 A | 3/2010 |
| JP | 07-123274 A | 5/1995 |
| JP | 2008-204184 A | 9/2008 |
| JP | 2009-136655 A | 6/2009 |
| KR | 1020000041331 A | 7/2000 |
| KR | 10-2008-0018469 A | 2/2008 |
| KR | 10-2008-0110170 A | 12/2008 |
| KR | 10-2009-0030779 A | 3/2009 |
| KR | 1020110087587 A | 8/2011 |
| WO | 03/043343 A2 | 5/2003 |
| WO | 2009/104315 A1 | 8/2009 |

OTHER PUBLICATIONS

Communication dated Oct. 13, 2017, from the European Patent Office in counterpart European Application No. 15859627.0.
Communication dated Apr. 13, 2018, issued by the Korean Intellectual Property Office in corresponding Korean Application No. 10-2017-7011648.
Communication issued Oct. 23, 2018, issued by the Korean Intellectual Property Office in counterpart Korean Patent Application No. 10-2017-7011648.
Chinese Patent Office, Communication dated Jul. 10, 2019, by the Chinese Patent Office in copending Application No. 201580072447.2.

* cited by examiner

<FREQUENCY BAND PATTERN 1>

<FREQUENCY BAND PATTERN 2>

<FREQUENCY BAND PATTERN 3>

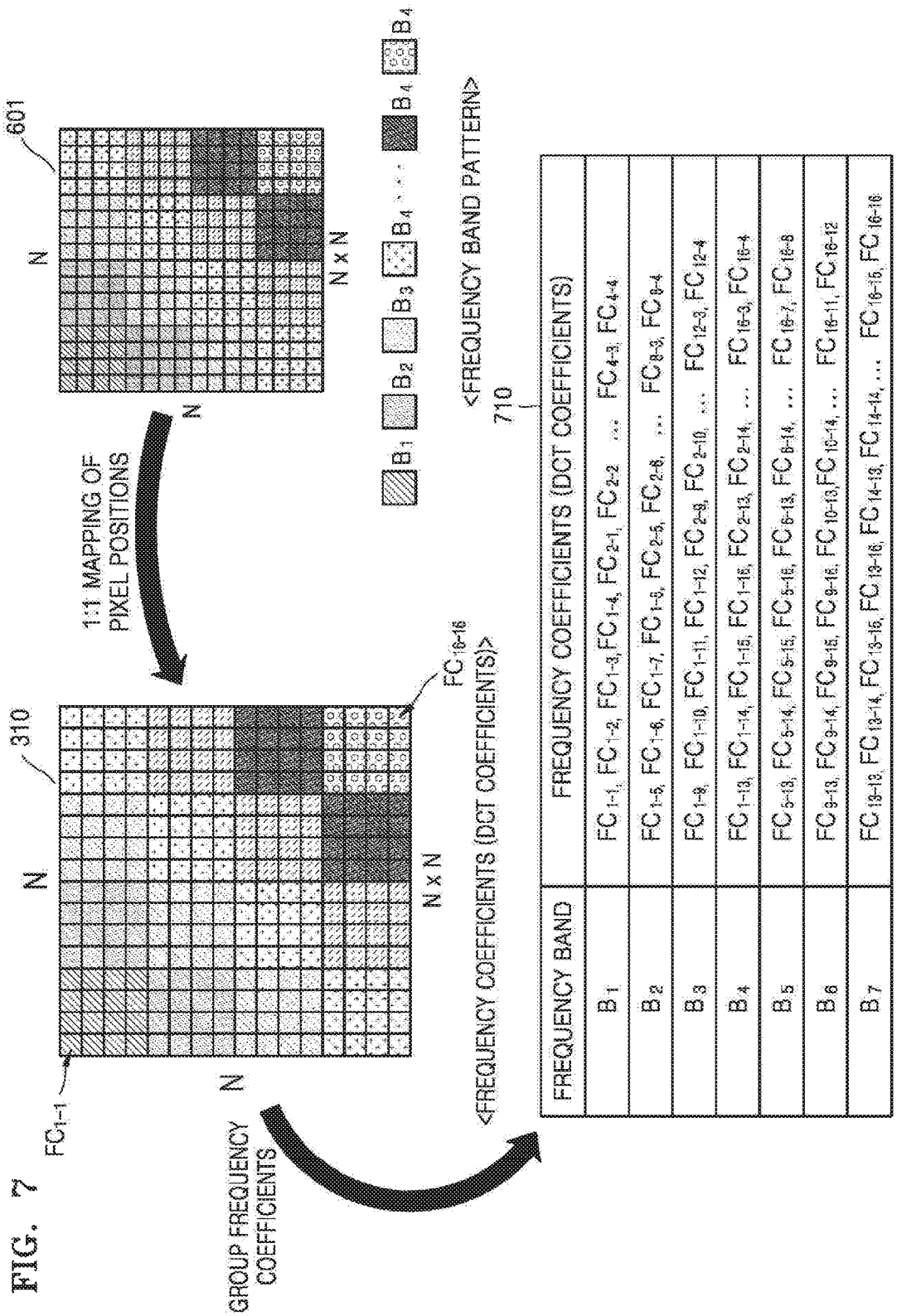

FIG. 9

$$\text{BAND VALUE OF FREQUENCY BAND } B_x = \begin{cases} \text{"1"}, & \text{if STATISTIC OF FREQUENCY COEFFICIENTS BELONGING TO FREQUENCY BAND } B_x \geq \text{THRESHOLD VALUE OF FREQUENCY BAND } B_x \\ & (\text{eg., Mean}_{B1}(FC_{1-1}, FC_{1-2}, FC_{1-3}, FC_{1-4}, FC_{2-1}, FC_{2-2}, \cdots, FC_{4-3}, FC_{4-4}) \geq TH_{B1}) \\ \text{"0"}, & \text{if STATISTIC OF FREQUENCY COEFFICIENTS BELONGING TO FREQUENCY BAND } B_x \geq \text{THRESHOLD VALUE OF FREQUENCY BAND } B_x \\ & (\text{eg., Mean}_{B1}(FC_{1-1}, FC_{1-2}, FC_{1-3}, FC_{1-4}, FC_{2-1}, FC_{2-2}, \cdots, FC_{4-3}, FC_{4-4}) \geq TH_{B1}) \end{cases}$$

METHOD AND DEVICE FOR GENERATING METADATA INCLUDING FREQUENCY CHARACTERISTIC INFORMATION OF IMAGE

This application is a National stage entry of International Application No. PCT/KR2015/008740, filed on Aug. 21, 2015, which claims priority from U.S. Provisional Application No. 62/079,239, filed on Nov. 13, 2014 in the United State Patent and Trademark Office. The disclosures of each of the applications are herein incorporated by reference in their entirety.

TECHNICAL FIELD

Provided are a method and device for generating metadata including frequency characteristic information of an image.

BACKGROUND ART

Recently, as display technology has evolved from full-high definition (HD) to ultra HD (UHD), etc., a UHD television (TV), a UHD monitor, etc. have been developed. UHD is a display technology implemented using a number of pixels which is four times the number of pixels of Full-HD. Display devices with a large number of pixels, e.g., Full-HD display devices or UHD display devices, are capable of minutely displaying even a fine part of an image. Thus, details or sharpness of an image is one of the important issues for realistically displaying images. In particular, the details or sharpness of the image is closely related to edges included in a scene of the image. When a scene of an image includes many edges, display devices use many hardware resources to process the image. Information regarding the edges included in the scene of the image, i.e., whether the scene has high-frequency characteristics or low-frequency characteristics, is important for display devices to more efficiently use hardware resources and more realistically display the image. Accordingly, various researches have been conducted to accurately and efficiently analyze the frequency characteristics of scenes of an image.

DETAILED DESCRIPTION OF THE INVENTION

Technical Problem

Provided are a method and device for generating metadata including frequency characteristic information of an image. Provided is also a non-transitory computer-readable recording medium having recorded thereon a program for performing the method in a computer. However, embodiments set forth herein are not limited thereto, and additional aspects can be derived from these embodiments.

Technical Solution

According to an aspect, a method of generating metadata including frequency characteristic information of an image includes converting pixel values of a current block among blocks divided from the image into frequency coefficients of a frequency domain; determining a band value of a frequency band corresponding to each of regions of the current block by using the frequency coefficients included in the regions of the current block, the regions of the current block being divided to correspond to different frequency bands; and generating metadata including the frequency characteristic information of the current block based on the determined band values.

The regions of the current block may include m regions which are set according to a predetermined frequency band pattern for dividing the frequency coefficients included in the current block into m frequency bands, wherein m is a natural number.

The frequency band pattern may have a size of N×N when the current block has an N×N pixel array size, wherein N is a natural number.

The frequency coefficients may include discrete cosine transform (DCT) coefficients generated by performing DCT on the pixel values. The frequency band pattern may divide the current block into the m regions corresponding to the m frequency bands in a diagonal direction crossing a direct-current (DC) coefficient of a low-frequency component and an alternating-current (AC) coefficient which is a highest-frequency component among the DCT coefficients.

The determining of the band value of the frequency band corresponding to each of the regions of the current block may include grouping the frequency coefficients of the current block into groups corresponding to the m frequency bands by using a predetermined frequency band pattern; evaluating the frequency coefficients belonging to each of the groups; and determining the band values based on a result of evaluating the frequency coefficients belonging to each of the groups.

Different threshold values of the frequency coefficients may be allocated to the frequency bands. The evaluating of the frequency coefficients belonging to each of the groups may include evaluating the frequency coefficients by comparing a statistic of the frequency coefficients belonging to each of the groups with the threshold value allocated to the frequency band of each of the groups.

The determining of the band value of the frequency band corresponding to each of the regions of the current block may include determining a band value of a frequency band corresponding to each of the groups to be '1' when a result of the comparison reveals that the statistic of the frequency coefficients belonging to each of the groups is greater than or equal to the threshold value allocated to the frequency band corresponding to each of the groups, and determining the value of the frequency band corresponding to each of the groups to be '0' when the statistic of the frequency coefficients is less than the threshold value.

When the predetermined frequency band pattern includes m frequency bands, the determining of the band value of the frequency band corresponding to each of the regions of the current block may include generating an m-digit bit string having bits corresponding to the m band values, and frequency characteristics of the current block may be expressed as a value calculated from the m-digit the bit string.

The image may be clustered to have frequency characteristics of one of a high-frequency image, a mid-frequency image, and a low-frequency image, based on a statistic of scalar values calculated with respect to each of the blocks.

The metadata may be generated by an image transmission device which transmits the image, and transmitted together with the image from the image transmission device to an image receiving device which reproduces the image. The clustering of the image may be performed by at least one of the image transmission device and the image receiving device.

According to another aspect, a device for generating metadata including frequency characteristic information of an image includes a frequency converter configured to convert pixel values of a current block among blocks divided from the image into frequency coefficients of a frequency domain; a frequency characteristics analyzer configured to determine a band value of a frequency band corresponding to each of regions of the current block by using the frequency coefficients included in the regions of the current block, the regions of the current block being divided to correspond to different frequency bands; and a metadata generator configured to generate metadata including the frequency characteristic information of the current block based on the determined band values.

The regions of the current block may include m regions which are set according to a predetermined frequency band pattern for dividing the frequency coefficients included in the current block into m frequency bands, wherein m is a natural number.

The frequency band pattern may have a size of N×N when the current block has an N×N pixel array size, wherein N is a natural number.

The frequency coefficients may include discrete cosine transform (DCT) coefficients generated by performing DCT on the pixel values. The frequency band pattern may divide the current block into the m regions corresponding to the m frequency bands in a diagonal direction crossing a direct-current (DC) coefficient of a low-frequency component and an alternating-current (AC) coefficient which is a highest-frequency component among the DCT coefficients.

The frequency characteristics analyzer may group the frequency coefficients of the current block into groups corresponding to m frequency bands by using a predetermined frequency band pattern, evaluate the frequency coefficients belonging to each of the groups, and determine the band values based on a result of evaluating the frequency coefficients belonging to each of the groups.

Different threshold values of the frequency coefficients may be allocated to the frequency bands. The frequency characteristics analyzer may evaluate the frequency coefficients by comparing a statistic of the frequency coefficients belonging to each of the groups with the threshold value allocated to the frequency band of each of the groups.

The frequency characteristics analyzer may determine a band value of a frequency band corresponding to each of the groups to be '1' when a result of the comparison reveals that the statistic of the frequency coefficients belonging to each of the groups is greater than or equal to the threshold value allocated to the frequency band corresponding to each of the groups, and determine the band value of the frequency band corresponding to each of the groups to be '0' when the result of the comparison reveals that the statistic of the frequency coefficients is less than the threshold value.

When the predetermined frequency band pattern includes m frequency bands, the frequency characteristics analyzer may generate an m-digit bit string having bits corresponding to the m band values. Frequency characteristics of the current block may be expressed as a value calculated from the m-digit the bit string.

The image may be clustered to have frequency characteristics of one of a high-frequency image, a mid-frequency image, and a low-frequency image, based on a statistic of scalar values calculated with respect to each of the blocks. The device may be an image transmission device which transmits the image. The metadata may be transmitted together with the image from the image transmission device to an image receiving device which reproduces the image. The clustering of the image may be performed by at least one of the image transmission device and the image receiving device.

According to another aspect, a method of analyzing frequency characteristics of an input image, performed by an image receiving device, includes performing learning of clustering levels for clustering frequency characteristics of training images by using the training images, the training images including different frequency characteristics; receiving metadata including frequency characteristic information of the input image from an image transmission device; and clustering the frequency characteristics of the input image by determining a clustering level corresponding to the frequency characteristic information included in the metadata among the learned clustering levels.

The received metadata may include the frequency characteristic information generated based on band values of frequency bands determined using a frequency band pattern with respect to frequency coefficients converted from the input image.

The received metadata may include the frequency characteristic information representing a scalar value or a distribution of scalar values corresponding to the frequency characteristics of the input image.

The performing of the learning the clustering levels may include performing the learning of the clustering levels by using a multi-class support vector machine (SVM). The clustering levels may correspond to hyperplanes determined by the multi-class SVM.

The learned clustering levels may include a clustering level for performing clustering to a high-frequency image; a clustering level for performing clustering to a mid-frequency image; and a clustering level for performing clustering to a low-frequency image.

According to another aspect, an image receiving device for analyzing frequency characteristics of an input image includes a frequency characteristics classifier configured to perform learning of clustering levels for clustering frequency characteristics of training images by using the training images, the training images including different frequency characteristics; and a receiver configured to receive metadata including frequency characteristic information of the input image from an image transmission device. The frequency characteristics classifier clusters the frequency characteristics of the input image by determining a clustering level corresponding to the frequency characteristic information included in the metadata among the learned clustering levels.

The received metadata may include the frequency characteristic information generated based on band values of frequency bands determined using a frequency band pattern with respect to frequency coefficients converted from the input image.

The received metadata may include the frequency characteristic information representing a scalar value or a distribution of scalar values corresponding to the frequency characteristics of the input image.

The frequency characteristics classifier may perform the learning of the clustering levels by using a multi-class support vector machine (SVM). The clustering levels may correspond to hyperplanes determined by the multi-class SVM.

The learned clustering levels may include a clustering level for performing clustering to a high-frequency image; a clustering level for performing clustering to a mid-frequency image; and a clustering level for performing clustering to a low-frequency image.

According to another aspect, a non-transitory computer-readable recording medium having recorded thereon a program for performing, in a computer, the method of generating metadata or the method of analyzing frequency characteristics is provided.

DESCRIPTION OF THE DRAWINGS

FIG. 7 is a diagram illustrating grouping frequency coefficients into groups corresponding to frequency bands by using a frequency band pattern, according to an embodiment.

FIG. 9 is a diagram illustrating determining a band value of each of frequency bands by evaluating frequency coefficients belonging to a group corresponding to each of frequency bands of a frequency band pattern, according to an embodiment.

BEST MODE

Figure 1:
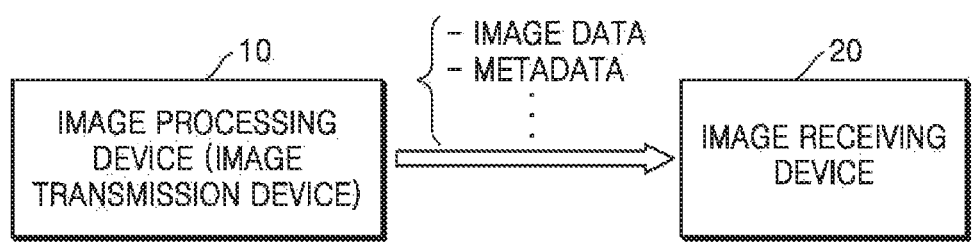
FIG. 1 is a diagram for explaining data transmitted from an image processing device (an image transmission device) to an image receiving device, according to an embodiment.

According to an aspect, a method of generating metadata including frequency characteristic information of an image includes converting pixel values of a current block among blocks divided from the image into frequency coefficients of a frequency domain; determining a band value of a frequency band corresponding to each of regions of the current block by using the frequency coefficients included in the regions of the current block, the regions of the current block being divided to correspond to different frequency bands; and generating metadata including the frequency characteristic information of the current block based on the determined band values.

According to another aspect, a device for generating metadata including frequency characteristic information of an image includes a frequency converter configured to convert pixel values of a current block among blocks divided from the image into frequency coefficients of a frequency domain; a frequency characteristics analyzer configured to determine a band value of a frequency band corresponding to each of regions of the current block by using the frequency coefficients included in the regions of the current block, the regions of the current block being divided to correspond to different frequency bands; and a metadata generator configured to generate metadata including the frequency characteristic information of the current block based on the determined band values.

According to another aspect, a method of analyzing frequency characteristics of an input image, performed by an image receiving device, includes performing learning of clustering levels for clustering frequency characteristics of training images by using the training images, the training images including different frequency characteristics; receiving metadata including frequency characteristic information of the input image from an image transmission device; and clustering the frequency characteristics of the input image by determining a clustering level corresponding to the frequency characteristic information included in the metadata among the learned clustering levels.

According to another aspect, an image receiving device for analyzing frequency characteristics of an input image includes a frequency characteristics classifier configured to perform learning of clustering levels for clustering frequency characteristics of training images by using the training images, the training images including different frequency characteristics; and a receiver configured to receive metadata including frequency characteristic information of the input image from an image transmission device. The frequency characteristics classifier clusters the frequency characteristics of the input image by determining a clustering level corresponding to the frequency characteristic information included in the metadata among the learned clustering levels.

Mode of the Invention

The terminology used in embodiments set forth herein will be briefly described and then the embodiments will be described in greater detail.

In the embodiments, general terms that have been widely used nowadays are selected, if possible, in consideration of functions of the present invention, but non-general terms may be selected according to the intentions of those of ordinary skill in the art, precedents, or new technologies, etc. Furthermore, some terms may be arbitrarily chosen by the present applicant. In this case, the meanings of these terms will be explained in corresponding parts of the embodiments in detail. Thus, the terms used herein should be defined not based on the names thereof but based on the meanings thereof and the whole context of the embodiments.

In all the embodiments, it will be understood that when an element is referred to as "including" another element, the element can further include other elements unless stated otherwise. The terms "unit", "module", etc. used herein should be understood as units which process at least one function or operation and may be embodied as hardware, software, or a combination of hardware and software.

Terms such as "comprise" and "include," when used in the embodiments, should not be understood to include all various elements or operations stated herein. Some of the elements and the operations may be omitted or additional elements and operations may be added.

Hereinafter, exemplary embodiments will be described in greater detail with reference to the accompanying drawings. These embodiments are not intended to restrict the scope of the invention and are only provided to describe the invention in detail. Matters which may be easily derived from the detailed description and the embodiments by those of ordinary skill in the art should be understood to fall within the scope of the invention.

FIG. 1 is a diagram for explaining data transmitted from an image processing device (an image transmission device) to an image receiving device, according to an embodiment.

Referring to FIG. 1, an image processing device (an image transmission device) 10 may transmit image data and metadata generated with respect to the image data to an image receiving device 20. The image data may include video data, photograph data, etc.

The image processing device 10 may be an image transmission device in terms of the image receiving device 20. Examples of the image processing device 10 may include, but are not limited to, a broadcasting server, a television (TV), a smartphone, a tablet device, a personal computer (PC), a laptop computer, etc. which generate image content such as video, a photograph, etc. The image receiving device 20 may be a device having functions of receiving image content such as video, a photograph, etc. from the outside and reproducing and displaying the received image content. Examples of the image receiving device 20 may include a TV, a smartphone, a tablet device, a set-top box, etc. but are not limited thereto.

The image processing device 10 may generate metadata including various types of information related to an image, such as information regarding the resolution of the image, codec information, and detail information, together with image data. In the present embodiment, the detail information of the image included in the metadata may be information regarding frequency characteristics of the image representing whether high-frequency components or low-frequency components of the image are dominant. For example, it may be analyzed that the image includes many high-frequency components when a scene of the image includes a large number of edges and includes many low-frequency components when the scene of the image includes a relatively small number of edges. That is, a degree of details of the image may depend on the frequency characteristics of the image.

The image processing device 10 according to the present embodiment may analyze the frequency characteristics of the image, include detail information indicating whether the image is a high-frequency image or a low-frequency image into metadata, and provide the metadata together with the image to the image receiving device 20. Here, the metadata may be provided as a supplemental enhancement information (SEI) message of a video codec or be used as a representation of the inside of a disc, a media player, a TV, but is not limited thereto.

Functions and operations of the image processing device 10 for analyzing frequency characteristics of an image will be described in detail below.

Figure 2:
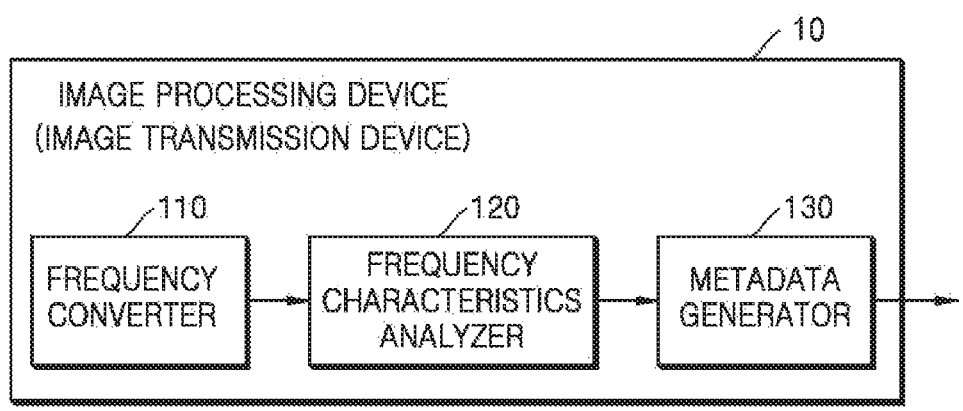
FIG. 2 is a block diagram of hardware elements of an image processing device according to an embodiment.

FIG. 2 is a block diagram of hardware elements of an image processing device according to an embodiment.

Referring to FIG. 2, an image processing device 10 may include a frequency converter 110, a frequency characteristics analyzer 120, and a metadata generator 130. Although not shown in FIG. 2, the frequency converter 110, the frequency characteristics analyzer 120, and the metadata generator 130 may be realized using hardware modules such as one or more processors, software modules, or a combination thereof. FIG. 2 illustrates only elements of the image processing device 10 related to the present embodiment. It would be apparent to those of ordinary skill in the art that other general-purpose elements may be further included in addition to the elements illustrated in FIG. 2.

The frequency converter 110 converts pixel values of a current block among blocks divided from an image into frequency coefficients in a frequency domain. For frequency conversion, the frequency converter 110 may perform discrete cosine transform (DCT). That is, the frequency coefficients obtained through the conversion by the frequency converter 110 include DCT coefficients generated by performing DCT on the pixel values.

Figure 3:
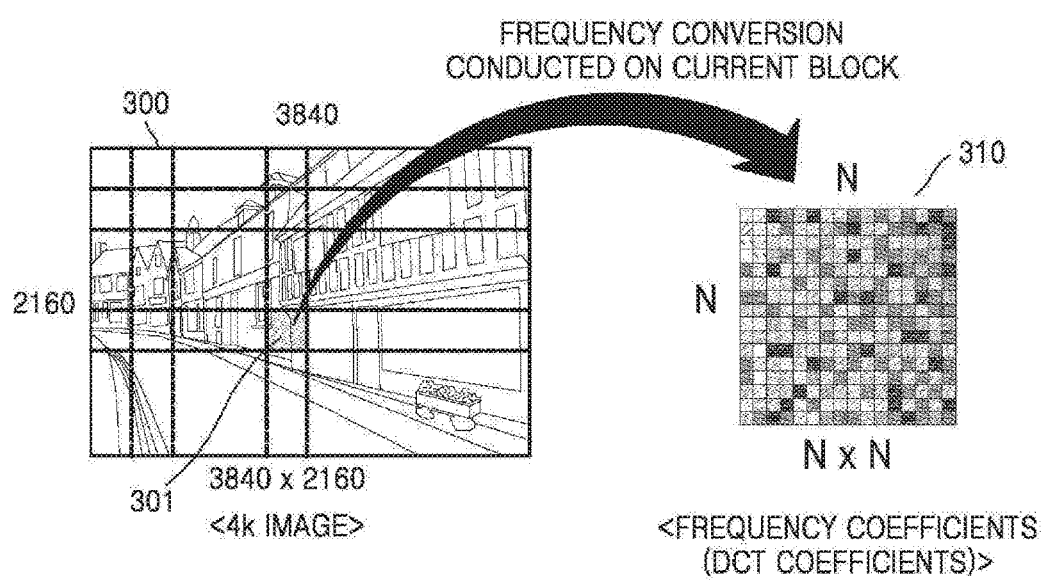
FIG. 3 is a diagram illustrating frequency conversion performed on a current block of an image, according to an embodiment.

FIG. 3 is a diagram illustrating frequency conversion performed on a current block of an image, according to an embodiment.

Referring to FIG. 3, it is assumed that an image 300 is a 4 k image having a 3840×2160 pixel size, however, this is merely an example and the present embodiment is also applicable to images having different pixel sizes. The image 300 may be divided into blocks having a certain size. Here, the certain size may be an N×N pixel size (here, N is a natural number). Frequency characteristics of the image 300 may be analyzed in units of N×N blocks. In the present embodiment, a current block 301 may be a block to be currently processed to analyze the frequency characteristics of the image 300.

The frequency converter 110 converts pixel values of the current block 301 having an N×N size into N×N frequency coefficients (DCT coefficients) 310. For example, when N is 16, 256 pixel values included in the current block 301 may be converted into 256 frequency coefficients (DCT coefficients) 310.

Figure 4:
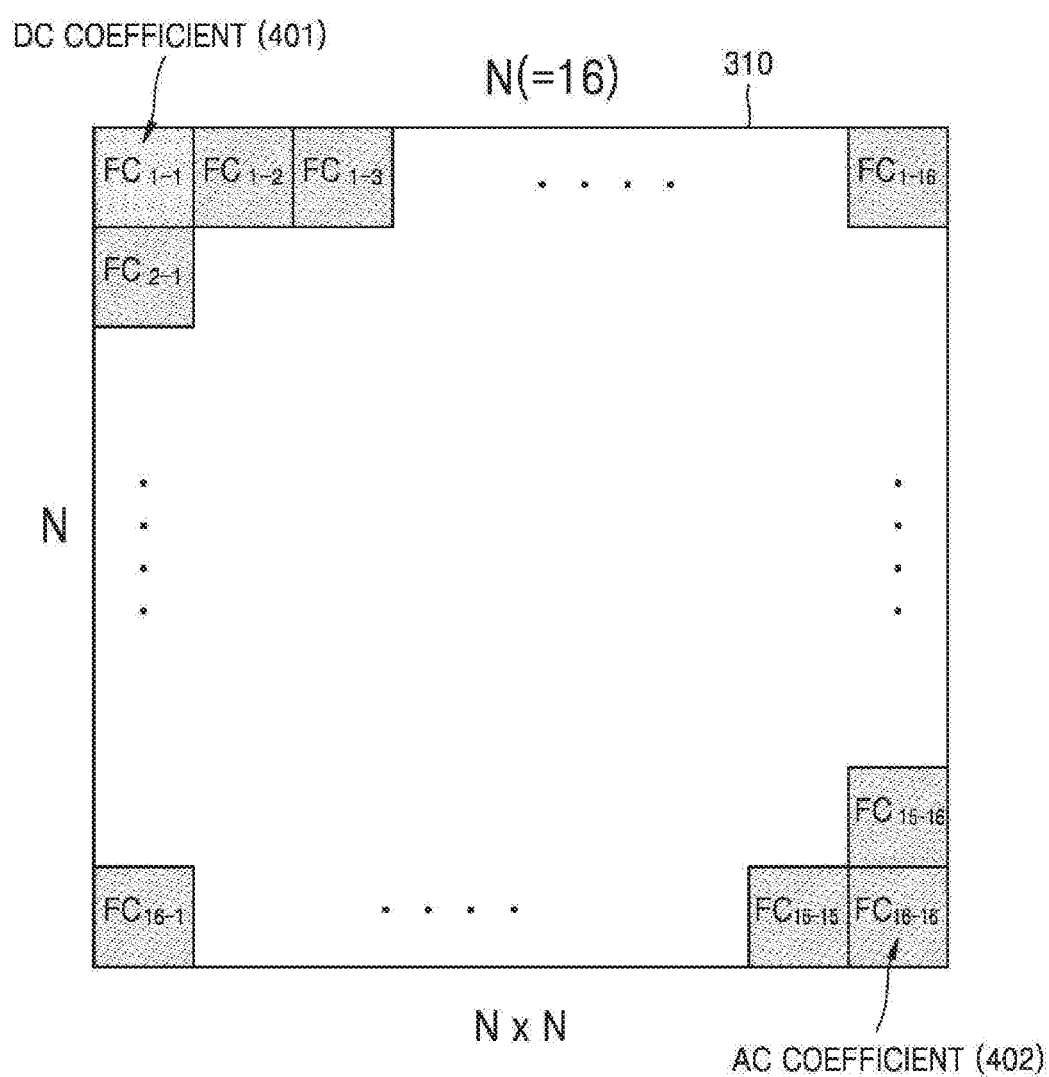
FIG. 4 is a diagram illustrating frequency coefficients obtained through conversion performed by a frequency converter, according to an embodiment.

FIG. 4 is a diagram illustrating frequency coefficients obtained through conversion performed by a frequency converter, according to an embodiment.

Referring to FIG. 4, the frequency coefficients 310 are 256 values, the number of which is equal to the number of pixels of the current block 301 having the size of N×N described above (in this case, N=16). A frequency coefficient $FC_{1-1}$ corresponding to a pixel value in a first row and a first column of the current block 301 corresponds to a direct-current (DC) coefficient 401. The other frequency coefficients $FC_{1-2}$ to $FC_{16-16}$ correspond to alternating-current (AC) coefficients. In this case, the frequency coefficient $FC_{16-16}$ 402 corresponding to a pixel value at a lowermost right portion (a sixteenth row and a sixteenth column) of the current block 301 may correspond to a frequency coefficient indicating a highest-frequency component.

As described above with reference to FIGS. 3 and 4, the frequency converter 110 converts 256 pixel values of the current block 301 having a size of 16×16 into the 256 16×16 frequency coefficients (DCT coefficients) 310. Although it is assumed that N is 16 in embodiments, it would be apparent to those of ordinary skill in the art that N may be easily applied to present embodiments even when N is a value other than 16

Referring back to FIG. 2, the frequency characteristics analyzer 120 determines a band value of a frequency band corresponding to each of regions of the current block 301 divided to correspond to different frequency bands by using frequency coefficients included in each of the regions of the current block 301. Here, the regions may be m regions which are set using a predetermined frequency band pattern to divide the frequency coefficients 310 included in the current block 301 into m frequency bands (here, m is a natural number).

The frequency band pattern has the same pixel size as the current block 301, and may be a pattern having a size of N×N when the current block 301 has an N×N pixel array size. The frequency band pattern will be described in more detail with reference to FIGS. 5A to 6C below.

Figure 5A:
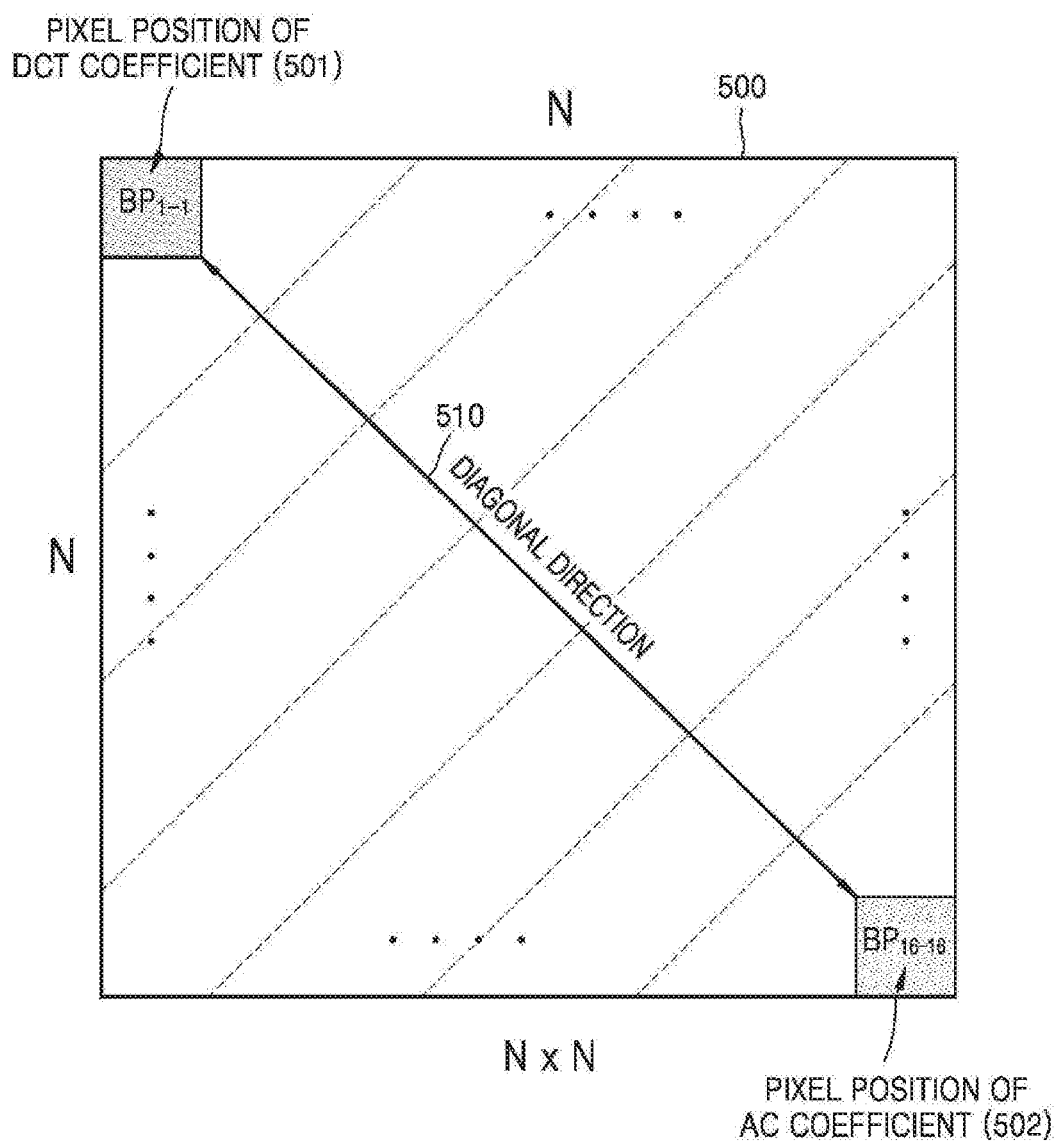
FIG. 5A is a diagram illustrating a criterion for defining a frequency band pattern according to an embodiment.

FIG. 5A is a diagram illustrating a criterion for defining a frequency band pattern according to an embodiment.

Referring to FIG. 5A, a frequency band pattern 500 is an N×N pattern having the same size as the current block 301 and may include N×N pixels as described above. The frequency band pattern 500 may be a pattern dividing the current block 301 into m regions corresponding to m frequency bands in a diagonal direction 510 crossing a position 501 of a pixel $BP_{1-1}$ of a DC coefficient 401 of a low-frequency component and a position 502 of a pixel $BP_{16-16}$ of an AC coefficient 402 of a highest-frequency component among the frequency coefficients (DCT coefficients) 310 of FIG. 4. FIG. 5A illustrates that the current block 301 is divided into m regions by broken lines. It is assumed that m is '7' in the embodiments set forth herein, but it would be apparent to those of ordinary skill in the art that m may be easily applied to the embodiments even when m is changed to a value other than '7'. The m regions may have the same thickness or may have different thicknesses.

FIG. 5A illustrates the diagonal direction 510 as an example of a criterion for defining the frequency band pattern. However, the frequency band pattern according to the present embodiment is not limited thereto, and a straight line, a curved line, or the like other than the diagonal direction 510 or a round shape may be defined as a criterion for defining the frequency band pattern.

Figure 5B:
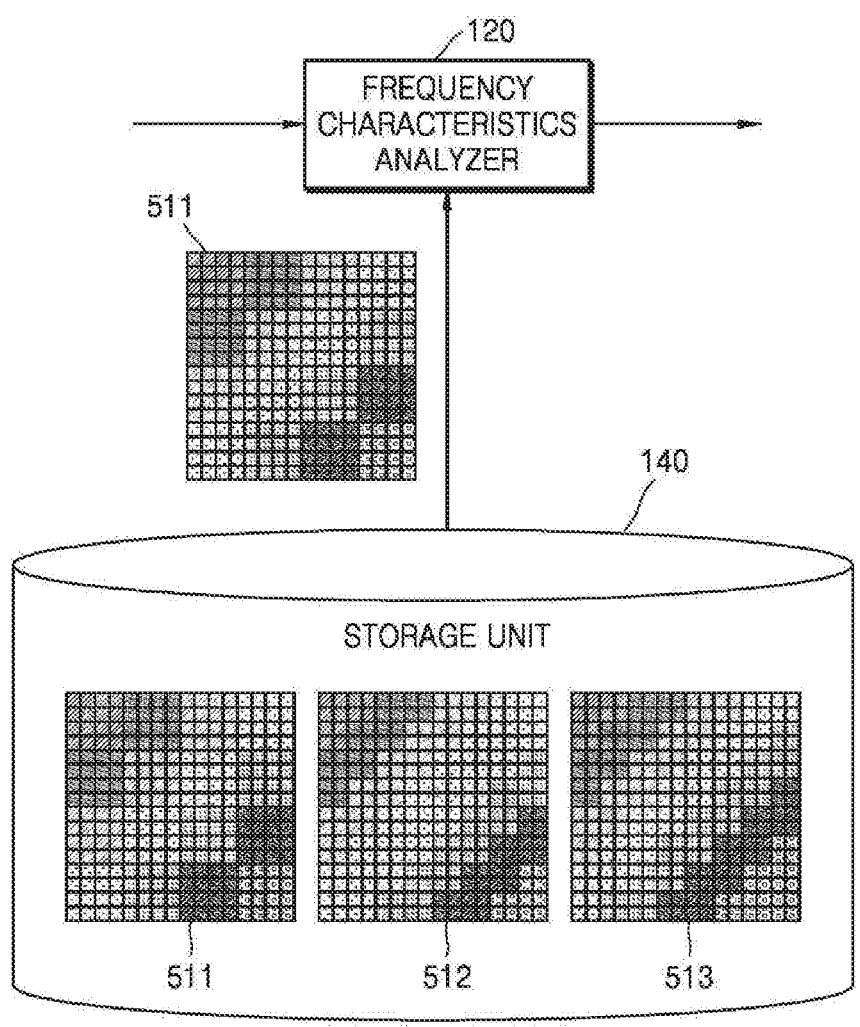
FIG. 5B is a diagram illustrating reading out a frequency band pattern stored in a storage unit by a frequency characteristics analyzer, according to an embodiment.

FIG. 5B is a diagram illustrating reading out a frequency band pattern stored in a storage unit by a frequency characteristics analyzer, according to an embodiment.

Referring to FIG. 5B, besides the elements illustrated in FIG. 2, the image processing device 10 may further include a storage unit 140. The storage unit 140 may store information regarding various types of predetermined frequency band patterns 511, 512, and 513 beforehand. The frequency characteristics analyzer 120 may select and read out a frequency band pattern (e.g., the frequency band pattern 511) from the storage unit 140 to perform a frequency characteristics analysis.

Figure 6A:
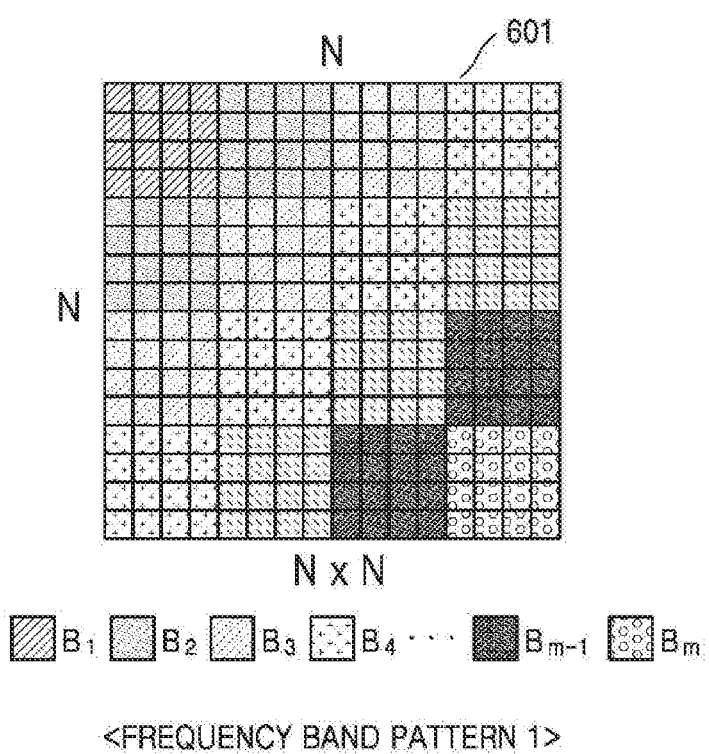
FIGS. 6A to 6C are diagrams illustrating frequency band patterns according to embodiments.
Figure 6B:
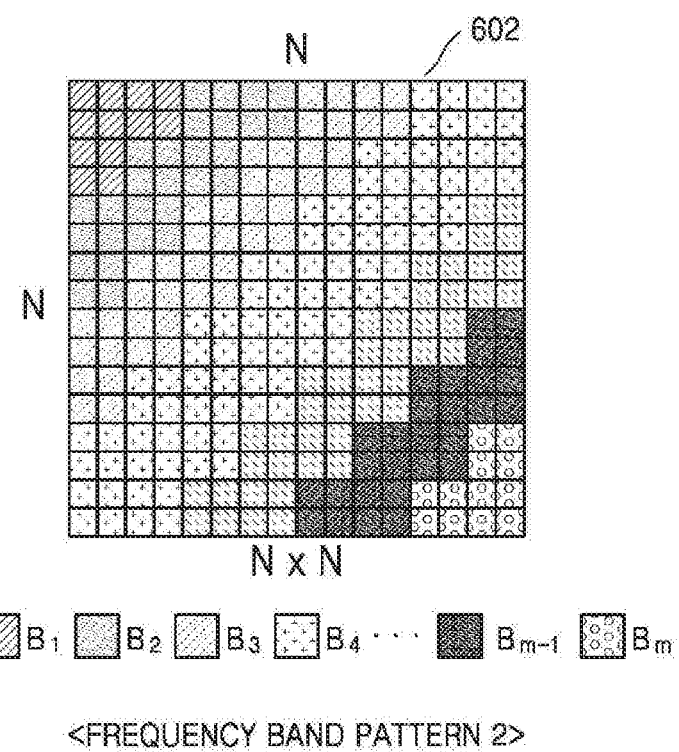
Figure 6C:
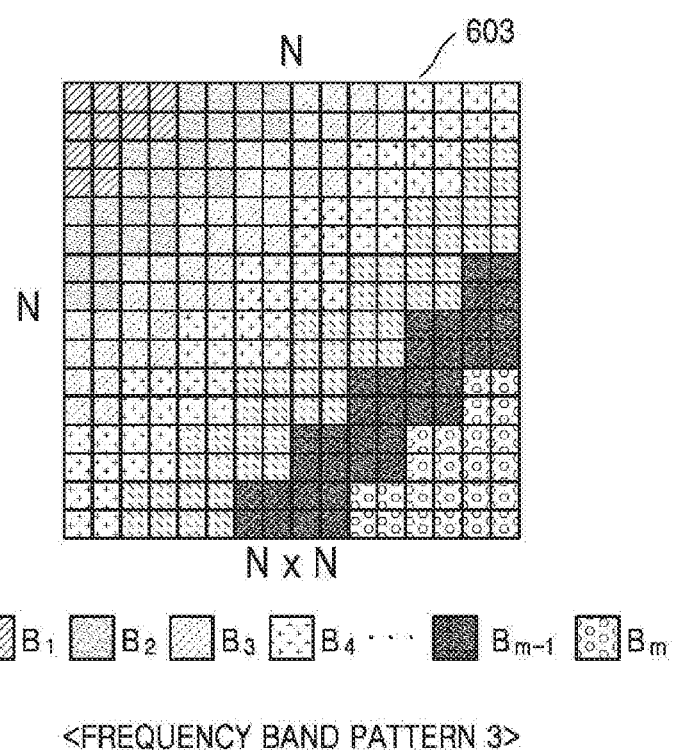

FIGS. 6A to 6C are diagrams illustrating frequency band patterns according to embodiments.

Referring to FIGS. 6A to 6C, frequency band patterns 601, 602, and 603 are N×N patterns defining how to divide the current block 301 into m regions corresponding to m frequency bands (here, m=7).

The frequency band patterns 601, 602, and 603 divide an N×N block into seven regions corresponding to a frequency band $B_1$ to a frequency band $B_m$ (here, N=16). The positions of pixels included in the frequency band patterns 601, 602, and 603 may be mapped to those of pixels included in the current block 301 in a 1:1 fashion. Thus, the positions of the pixels included in the frequency band patterns 601, 602, and 603 may be mapped in a 1:1 fashion to the frequency coefficients (DCT coefficients) $FC_{1-1}$ to $FC_{16-16}$ 310 described above with reference to FIG. 4.

The first frequency band pattern 601 is a pattern defined such that m frequency bands have the same thickness and an N×N block is divided into 4×4 sub-blocks. The second frequency band pattern 602 is a pattern defined such that a frequency band $B_4$ is thicker than the other frequency bands and regions of an N×N block are divided into 2×2 sub-blocks. The third frequency band pattern 603 is a pattern defined such that a frequency band $B_m$ is thicker than the other frequency bands and an N×N block is divided into 2×2 sub-blocks. That is, the frequency band patterns 601, 602, and 603 may be defined in various ways which fall within the scope of the present embodiment. For convenience of explanation, a frequency characteristics analysis performed using the first frequency band pattern 601 will be described as an example below. However, it would be apparent to those of ordinary skill in the art that a frequency characteristics analysis may be performed using different types of frequency band patterns.

Referring back to FIG. 2, the frequency characteristics analyzer 120 groups the frequency coefficients 310 of the current block 301 into groups corresponding to m frequency bands by using a predetermined frequency band pattern. Furthermore, the frequency characteristics analyzer 120 evaluates frequency coefficients 310 belonging to each of the groups and determines band values of the respective frequency bands on the basis of a result of evaluating the frequency coefficients 310 belonging to each of the groups. A grouping process and a process of determining a band value will be described in more detail with reference to FIGS. 7 to 10 below.

FIG. 7 is a diagram illustrating grouping frequency coefficients into groups corresponding to frequency bands by using a frequency band pattern, according to an embodiment.

Referring to FIG. 7, a frequency band pattern 601 having a size of N×N may be mapped to the current block 301 having a size of N×N in a 1:1 fashion (here, N=16). Thus, sixteen frequency coefficients $FC_{1-1}$, $FC_{1-2}$, $FC_{1-3}$, $FC_{1-4}$, $FC_{2-1}$, $FC_{2-2}$, ..., $FC_{4-3}$, $FC_{4-4}$ among a total of 256 frequency coefficients 310 may be grouped into a group belonging to a frequency band $B_1$. Similarly, the other frequency coefficients may be grouped into groups respectively belonging to frequency bands $B_2$ to $B_7$. A table 710 shows a result of grouping the frequency coefficients 310. That is, all the frequency coefficients 310 may be divided into seven groups corresponding to the frequency bands $B_1$ to $B_7$ set using the frequency band pattern 601. However, embodiments are not limited thereto, and all the frequency coefficients 310 may be grouped differently from that shown in FIG. 7 when the second frequency band pattern 602 or the third frequency band pattern 603 described above is used.

Figure 8:
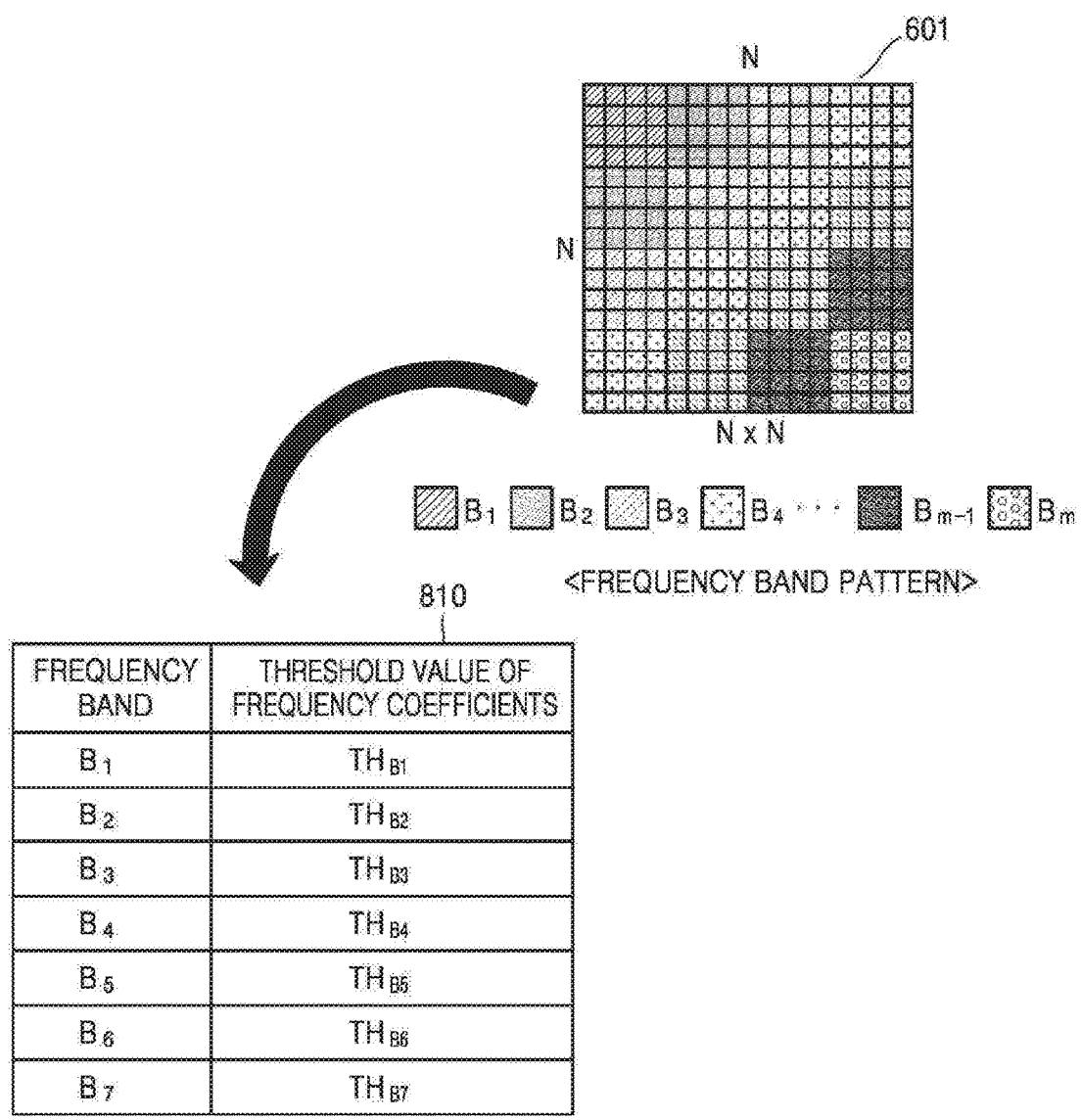
FIG. 8 is a diagram illustrating a threshold value of a frequency coefficient set for each of frequency bands defined using a frequency band pattern, according to an embodiment.

FIG. 8 is a diagram illustrating a threshold value of a frequency coefficient which is set for each of frequency bands defined using a frequency band pattern, according to an embodiment.

Referring to FIG. 8, different threshold values may be set for frequency bands $B_1$ to $B_m$ defined using a frequency band pattern 601 (here, m=7). For example, a threshold value $TH_{B1}$ may be set for the frequency band $B_1$ and a threshold value $TH_{B7}$ may be set for the frequency band $B_7$.

FIG. 9 is a diagram illustrating determining a band value of each of frequency bands by evaluating frequency coefficients belonging to a group corresponding to each of frequency bands of a frequency band pattern, according to an embodiment.

Referring to FIG. 9, the frequency characteristics analyzer 120 may evaluate frequency coefficients by comparing a statistic of frequency coefficients belonging to a group with a threshold value allocated to a frequency band corresponding to the group. The frequency characteristics analyzer 120 may determine a band value of the frequency band corresponding to the group when a result of the comparison reveals that the statistic of the frequency coefficients belonging to the group is greater than or equal to the threshold value allocated to the frequency band corresponding to the group, and determine the band value of the frequency band corresponding to the group to be '0' when the statistic is less than the threshold value. Here, the statistic may be a representative value of a statistical group, e.g., a mean, a median, a mode, or the like.

For example, the frequency characteristics analyzer 120 calculates a mean $Mean_{B1}$ of frequency coefficients $FC_{1-1}$, $FC_{1-2}$, $FC_{1-3}$, $FC_{1-4}$, $FC_{2-1}$, $FC_{2-2}$, . . . , $FC_{4-3}$, $FC_{4-4}$ belonging to a frequency band $B_1$. Then the frequency characteristics analyzer 120 compares a threshold value $TH_{B1}$ set for the frequency band $B_1$ with the mean $Mean_{B1}$. When the mean $Mean_{B1} \geq$ the threshold value $TH_{B1}$, the frequency characteristics analyzer 120 determines a band value of the frequency band $B_1$ to be '1'. When the mean $Mean_{B1} <$ the threshold value $TH_{B1}$, the frequency characteristics analyzer 120 determines the band value of the frequency band $B_1$ to be '0'. Similarly, the frequency characteristics analyzer 120 may determine band values of the frequency bands $B_2$ to $B_7$.

Referring back to FIG. 2, when the predetermined frequency band pattern includes m frequency bands, the frequency characteristics analyzer 120 generates an m-digit bit string having bits corresponding to m band values. The frequency characteristics of the current block 301 may be expressed as a value calculated from the m-digit bit string.

Figure 10:
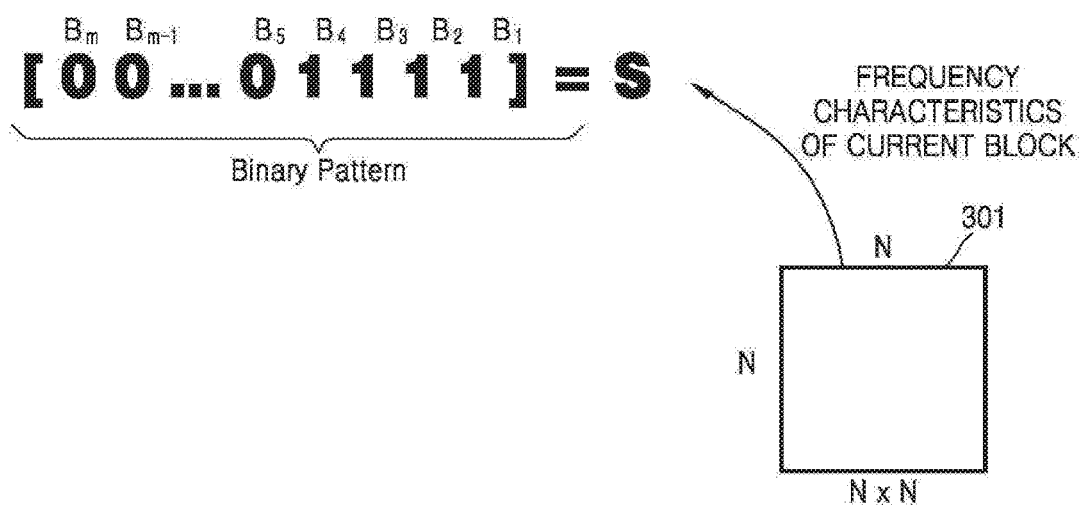
FIG. 10 is a diagram illustrating a binary pattern and a scalar value representing frequency characteristics of a current block according to an embodiment.

FIG. 10 is a diagram illustrating a binary pattern and a scalar value representing frequency characteristics of a current block according to an embodiment.

Referring to FIG. 10, the frequency characteristics analyzer 120 determines band values of frequency bands $B_1$ to $B_m$ as described above with reference to FIG. 9 (here, m=7). For example, the frequency characteristics analyzer 120 may determine a band value of the frequency band $B_1$ to be '1', a band value of the frequency band $B_2$ to be '1', a band value of the frequency band $B_3$ to be '1', a band value of the frequency band $B_4$ to be '1', a band value of the frequency band $B_5$ to be '0', a band value of the frequency band $B_6$ to be '0', and a band value of the frequency band $B_7$ to be '0'. The frequency characteristics analyzer 120 may generate an m-digit bit string with the m band values in the order of the m frequency bands. That is, the frequency characteristics analyzer 120 may generate a bit string having a binary pattern of "0001111".

The bit string having the binary pattern of "0001111" may be a representation of the frequency characteristic of the current block 301. Furthermore, the frequency characteristics analyzer 120 may determine a scalar value of the bit string "0001111" to be a representation of the frequency characteristics of the current block 301. That is, a scalar value S is $0*2^6+0*2^5+0*2^4+1*2^3+1*2^2+1*2^1+1*2^0=15$ and thus the frequency characteristics of the current block 301 may be expressed as a scalar value of 15. Thus, when the number of frequency bands defined using a frequency band pattern is 'm', the frequency characteristics of the current block 301 may be expressed as a value among 0 to $2^m-1$ which are within a range of the scalar value S.

In the frequency band pattern 601 described above, the frequency band $B_1$ corresponds to a region including the DC coefficient 401 and the frequency band $B_7$ corresponds to a region including the AC coefficient 402. Thus, the smaller the scalar value S of the current block 301, the more low-frequency characteristics may be dominant in the frequency characteristics of the current block 301. In contrast, the greater scalar value S of the current block 301, the more high-frequency characteristics may be dominant in the frequency characteristics of the current block 301.

Referring back to FIG. 2, the metadata generator 130 generates metadata including frequency characteristic information of the current block 301 based on the determined band values. That is, the metadata generator 130 may generate metadata including information of a binary pattern or a scalar value regarding the frequency characteristics of the current block 301. Alternatively, the metadata generator 130 may generate metadata including information regarding binary patterns or a distribution of scalar values regarding blocks included in the whole image 300.

Figure 11:
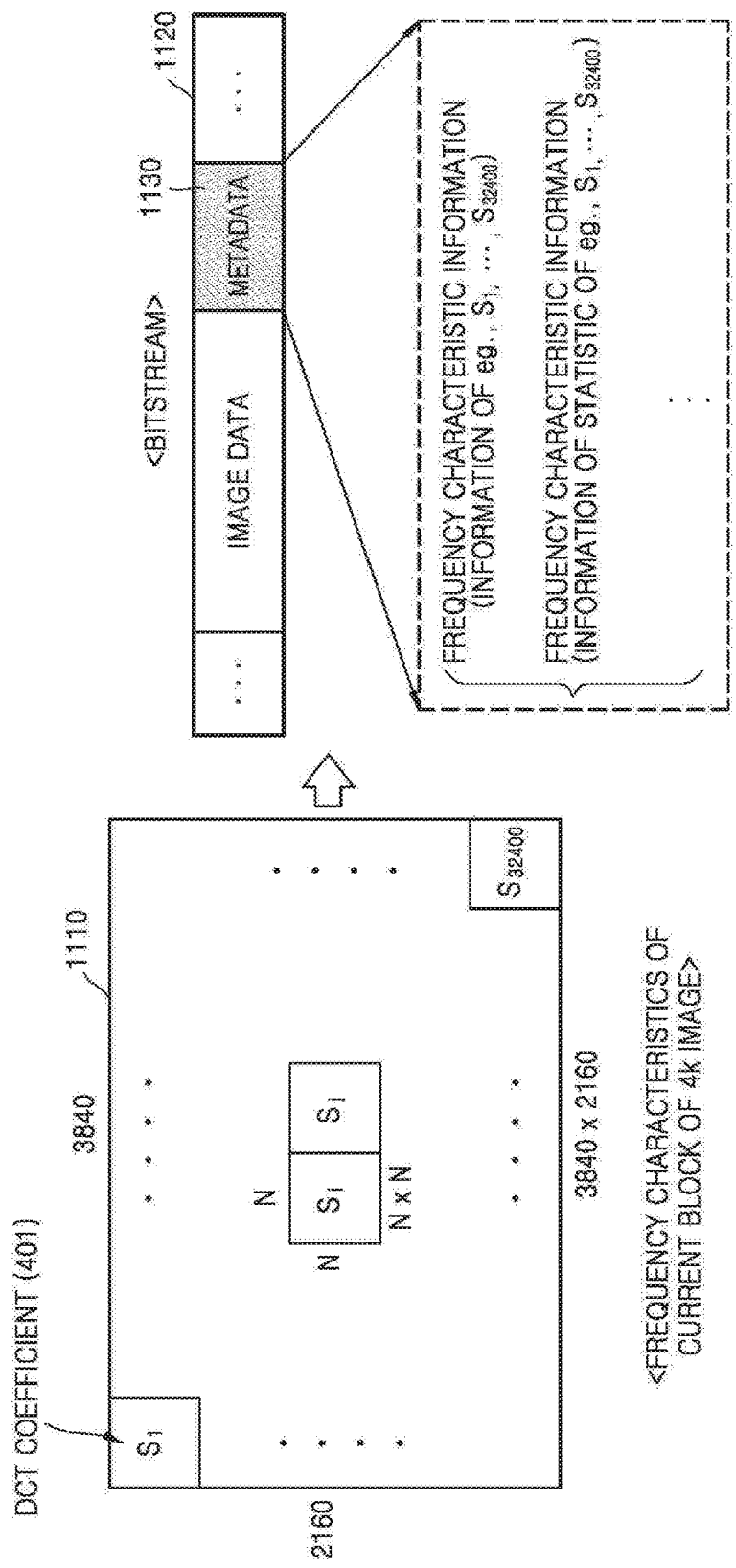
FIG. 11 is a diagram illustrating metadata generated by a metadata generator, according to an embodiment.

FIG. 11 is a diagram illustrating metadata generated by a metadata generator, according to an embodiment.

Referring to FIG. 11, a 4 k image 1110 having a size of 3840×2160 will be described as an example but the present embodiment is not limited thereto and is also applicable to images having different sizes. The 4 k image 1110 may be divided into 32400 N×N blocks (here, N=16). The image processing device 10 (the frequency characteristics analyzer 120) may determine scalar values $S_1$ to $S_{32400}$ representing frequency characteristics of the respective blocks as described above.

The metadata generator 130 may generate metadata 1130 including information of the scalar values $S_1$ to $S_{32400}$ representing the frequency characteristics of the respective blocks. The information of the scalar values $S_1$ to $S_{32400}$ representing the frequency characteristics of the respective blocks may be considered as frequency characteristics of the 4 k image 1110. Thus, the image receiving device 20 receiving the metadata 1130 including frequency characteristic information (detail information) of the scalar value $S_1$ the $S_{32400}$ together with image data of the 4 k image 1110 may determine whether high-frequency characteristics or low-frequency characteristics are dominant in the frequency characteristics of the 4 k image 1110 by parsing the frequency characteristic information included in the metadata 1130.

A distribution of the scalar value $S_1$ to $S_{32400}$ of the 4 k image 1110 may be also considered as the frequency characteristics of the 4 k image 1110. Thus, the metadata 1130 may include information regarding a statistic (or a distribution) of the scalar value $S_1$ to $S_{32400}$ as the frequency characteristic information of the 4 k image 1110.

The metadata 1130 may be included in a field of a bitstream 1120 generated by the image processing device 10 which is different from a field including the image data, and transmitted to the image receiving device 20.

A method of determining a scalar value (or a binary pattern) representing frequency characteristics of an image (a degree of details of the image) has been described above. Whether an image is to be clustered to a high-frequency image, a mid-frequency image, or a low-frequency image according to a determined scalar value (or a determined binary pattern) will be described in more detail below.

Figure 12:
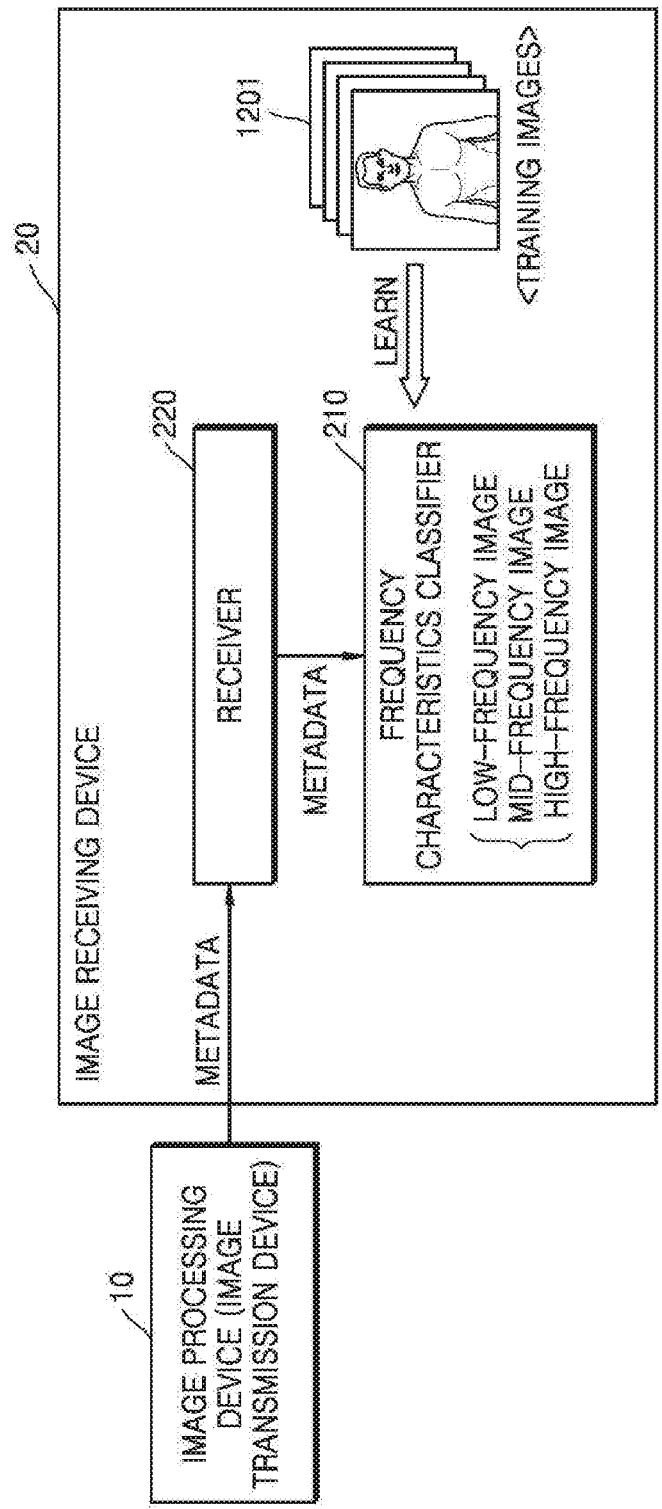
FIG. 12 is a diagram illustrating clustering frequency characteristics of an image from received metadata by an image receiving device, according to an embodiment.

FIG. 12 is a diagram illustrating clustering frequency characteristics of an image from received metadata by an image receiving device, according to an embodiment.

Referring to FIG. 12, an image processing device 10 provides an image receiving device 20 with only metadata including information of scalar values (or binary patterns) or information of a distribution of the scalar values. In other words, information indicating whether the scalar values or the distribution thereof corresponds to high-frequency characteristics, mid-frequency characteristics, or low-frequency characteristics may not be provided. In this case, the image receiving device 20 may perform clustering on the basis of the information of the scalar values or the information regarding the distribution of the scalar values which is included in the metadata to determine whether an image is a high-frequency image, a mid-frequency image, or a low-frequency image.

The image receiving device 20 may include a frequency characteristics classifier 210 and a receiver 220. FIG. 12 illustrates only the elements of the image receiving device 20 related to the present embodiment but it would be apparent to those of ordinary skill in the art that the image receiving device 20 may further include other general-purpose elements.

The frequency characteristics classifier 210 may perform learning of image frequency characteristics beforehand by using training images 1201. That is, the frequency characteristics classifier 210 may learn beforehand a rule for clustering a new image (new scalar values or a distribution thereof) when the new image is input by performing clustering beforehand to determine whether each of the training images 1201 corresponds to a high-frequency image, a mid-frequency image, or a low-frequency image. Here, the frequency characteristics classifier 210 may use a clustering algorithm such as a multi-class support vector machine (SVM) for clustering learning but embodiments are not limited thereto and a clustering algorithm similar to the SVM is also applicable to the present embodiment.

The receiver 220 receives metadata including frequency characteristic information of an input image from the image processing device (the image transmission device) 10.

When a clustering rule is generated through clustering learning using the training images 1201, the frequency characteristics classifier 210 performs clustering on the basis of the scalar values included in the metadata or the distribution of the scalar values to determine whether an input image corresponds to frequency characteristics of a high-frequency image, frequency characteristics of a mid-frequency image, or frequency characteristics of a low-frequency image. Although a case in which an input image is clustered according to three types of clustering levels such as a high-frequency image, a mid-frequency image, and a low-frequency image has been described in the present embodiment, the number of clustering levels may be changed variously. Here, when the clustering algorithm corresponds to the multi-class SVM, the clustering levels may correspond to hyperplanes determined by the multi-class SVM.

It has been described with reference to FIG. 12 above that a result of clustering frequency characteristics is not provided from the image processing device 10 to the image receiving device 20. However, the image processing device 10 may provide a result of clustering frequency characteristics to the image receiving device 20 as will be described with reference to FIG. 13 below. That is, clustering may be performed by at least one of the image processing device (the image transmission device) 10 and the image receiving device 20.

Figure 13:
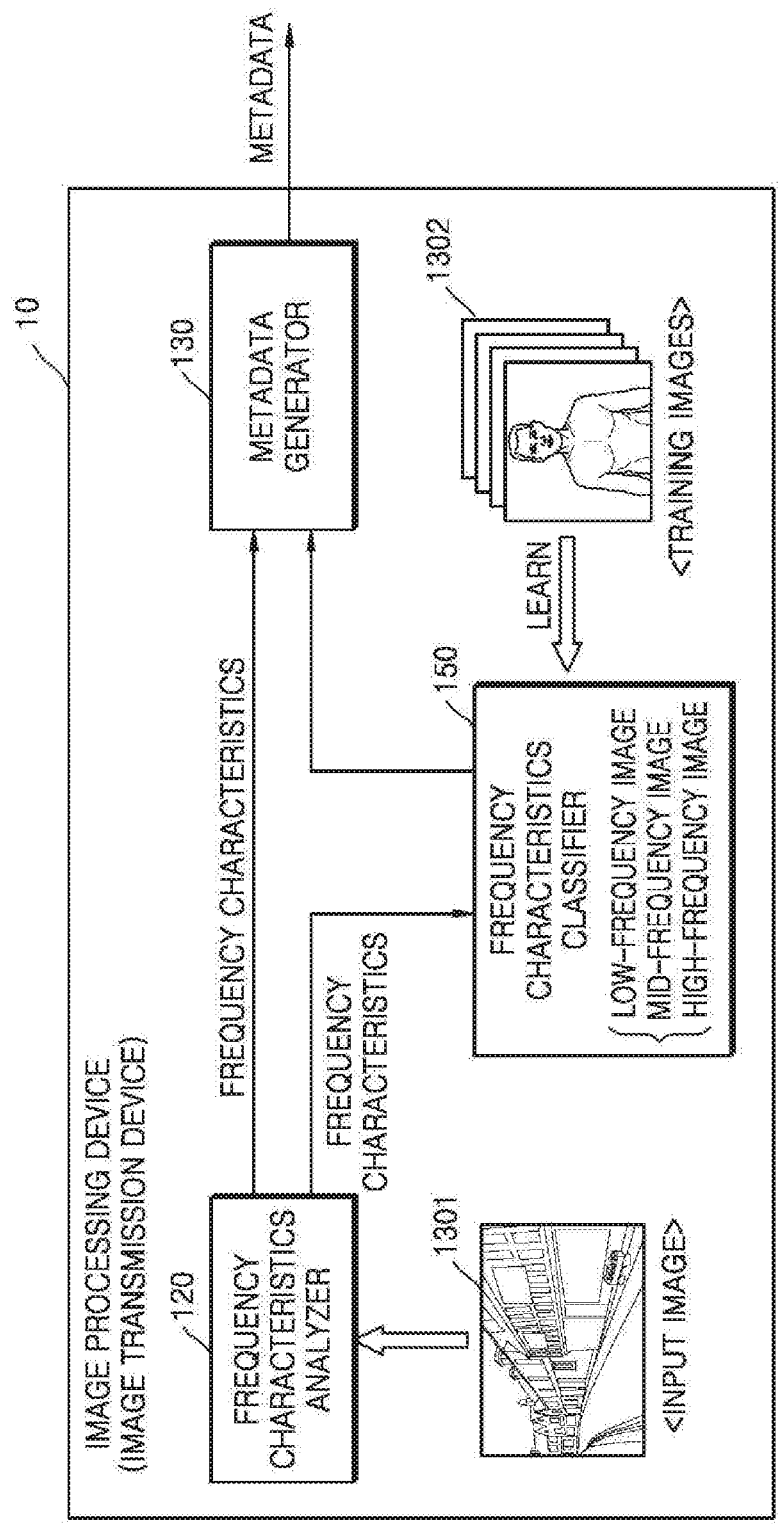
FIG. 13 is a diagram illustrating clustering frequency characteristics of an image by an image processing device, according to an embodiment.

FIG. 13 is a diagram illustrating clustering frequency characteristics of an image by an image processing device, according to an embodiment.

Referring to FIG. 13, an image processing device 10 may further include a frequency characteristics classifier 150.

A frequency characteristics analyzer 120 may transmit frequency characteristic information represented with information of scalar values (or binary patterns) or information of a distribution of the scalar values to the frequency characteristics classifier 150.

The frequency characteristics classifier 150 may perform learning of clustering image frequency characteristics beforehand by using training images 1301. That is, the frequency characteristics classifier 150 may learn beforehand a rule of clustering frequency characteristic information (scalar values or a distribution thereof) of a new image when the frequency characteristic information is received by clustering whether each of the training images 1301 corresponds to a high-frequency image, a mid-frequency image, or a low-frequency image. In this case, the frequency characteristics classifier 150 may use a clustering algorithm such as the SVM for clustering learning but embodiments are not limited thereto and a clustering algorithm similar to the SVM is also applicable to the present embodiment.

When a clustering rule is generated through clustering learning using the training images 1301, the frequency characteristics classifier 150 performs clustering on the basis of the frequency characteristic information (the scalar values or the distribution thereto) to determine whether an input image corresponds to frequency characteristics of a high-frequency image, frequency characteristics of a mid-frequency image, or frequency characteristics of a low-frequency image. Although a case in which an image is clustered according to three types of clustering levels such as a high-frequency image, a mid-frequency image, and a low-frequency image has been described in the present embodiment, the number of clustering levels may be changed variously.

The metadata generator 130 may generate metadata including information regarding a result of performing clustering by the frequency characteristics classifier 150 (a high-frequency image, a mid-frequency image, or a low-frequency image), together with the frequency characteristic information (the scalar values or the distribution thereof).

Figure 14A:
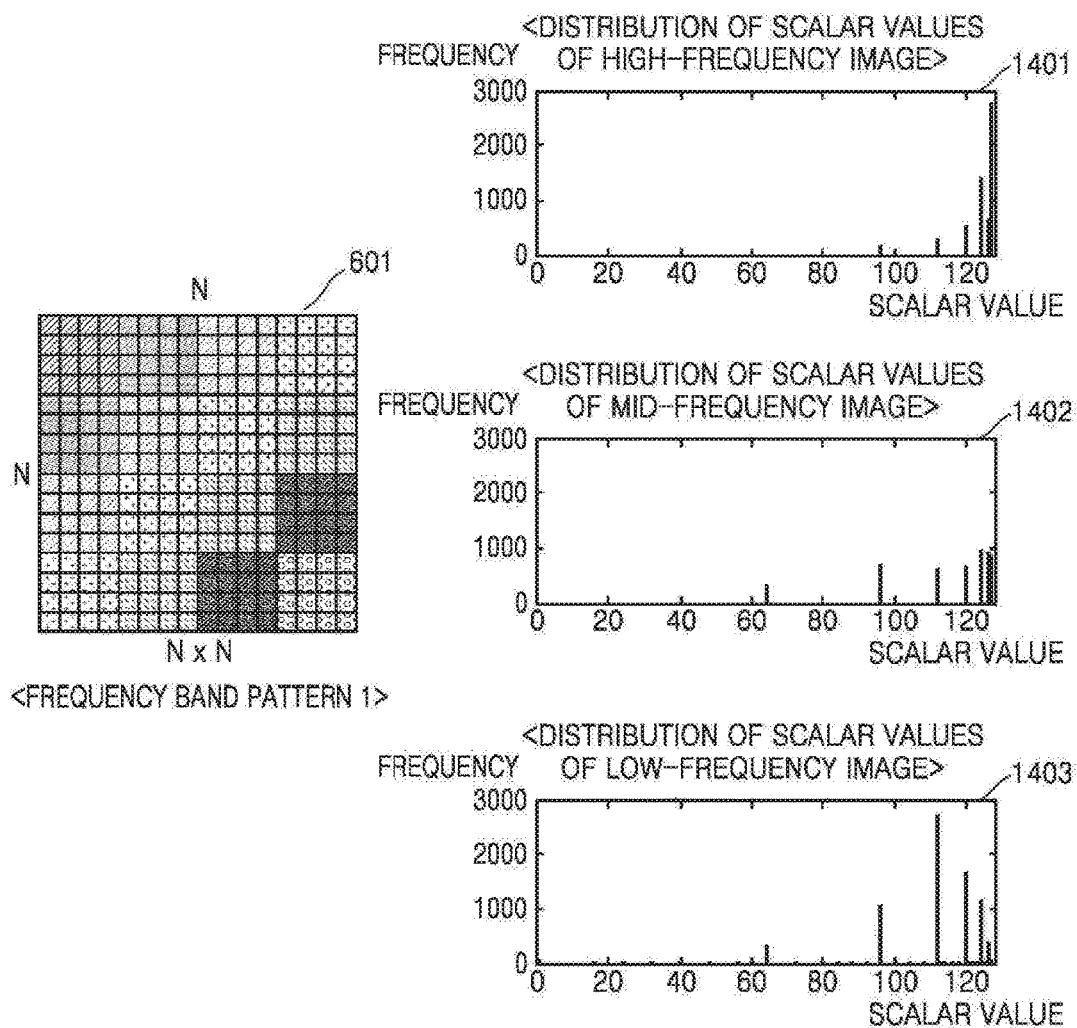
FIGS. 14A and 14B are diagrams illustrating a distribution of scalar values of each of a high-frequency image, a mid-frequency image, and a low-frequency image when frequency characteristics of an image are analyzed using a frequency band pattern, according to embodiments.
Figure 14B:
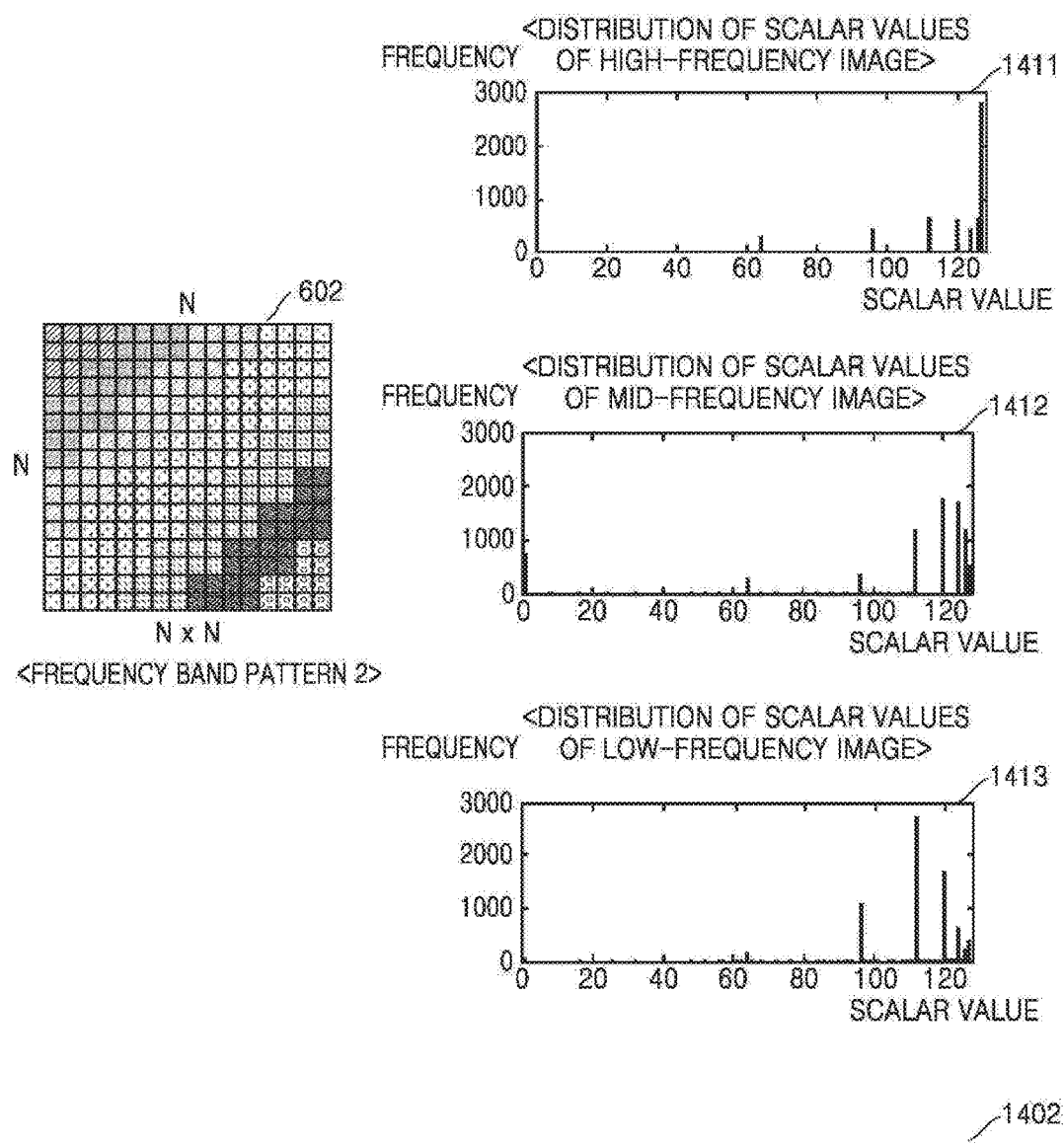

FIGS. 14A and 14B are diagrams illustrating a distribution of scalar values of each of a high-frequency image, a mid-frequency image, and a low-frequency image when frequency characteristics of an image are analyzed using a frequency band pattern, according to embodiments.

Referring to graphs 1401 and 1411 each showing a distribution of scalar values of a high-frequency image, the frequency of relatively large scalar values (e.g., scalar values ranging from 110 to 127) is high in the high-frequency image. Referring to graphs 1402 and 1412 each showing a distribution of scalar values of an mid-frequency image, the frequency of scalar values (e.g., scalar values ranging from 90 to 127) is relatively uniform in the mid-frequency image. Referring to graphs 1403 and 1413 each showing a distribution of scalar values of a low-frequency image, the frequency of scalar values representing high-frequency components (e.g., scalar values greater than or equal to 120) is low in the low-frequency image unlike in the mid-frequency image.

The graphs of FIGS. 14A and 14B are merely examples illustrated for convenience of explanation of the present embodiment. It would be apparent to those of ordinary skill in the art that an actual result of performing clustering may vary according to a clustering learning result.

As illustrated in FIGS. 14A and 14B, scalar values representing frequency characteristics may be concentrated in some specific values. Thus, the metadata generator 130 may generate metadata including only information regarding some types of scalar values with frequency greater than or equal to a predetermined threshold value (or some types of dominant scalar values), thereby reducing the amount of the metadata. Alternatively, the metadata generator 130 may generate metadata including only information regarding a predetermined number of scalar values in order of frequency to reduce the amount of the metadata. That is, the metadata generator 130 may generate metadata by omitting some of information regarding all scalar values determined by the frequency characteristics analyzer 120 to reduce the amount of the metadata.

Figure 15:
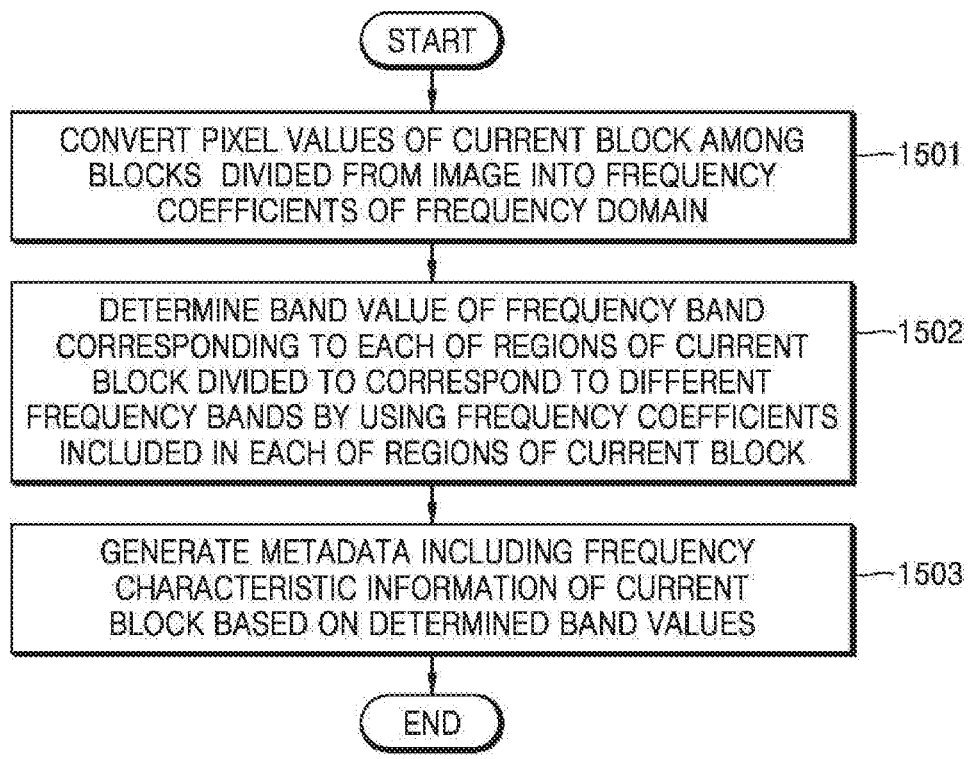
FIG. 15 is a flowchart of a method of generating metadata including frequency characteristic information of an image, according to an embodiment.

FIG. 15 is a flowchart of a method of generating metadata including frequency characteristic information of an image, according to an embodiment. Referring to FIG. 15, the method of generating metadata includes operations performed by the image processing device 10 of FIG. 2 in a sequential manner. Thus, although not described below, the description with reference to the figures preceding FIG. 15 is also applicable to the method of generating metadata of FIG. 15.

In operation S1501, the frequency converter 110 converts pixel values of the current block 301 among blocks divided from the image 300 into the frequency coefficients 310 of a frequency domain.

In operation S1502, the frequency characteristics analyzer 120 determines a band value of a frequency band corresponding to each of regions of the current block 301 divided to correspond to different frequency bands by using frequency coefficients included in each of the regions of the current block 301.

In operation S1503, the metadata generator 130 generates the metadata 1130 including frequency characteristic information of the current block 301 based on the determined band values.

Figure 16:
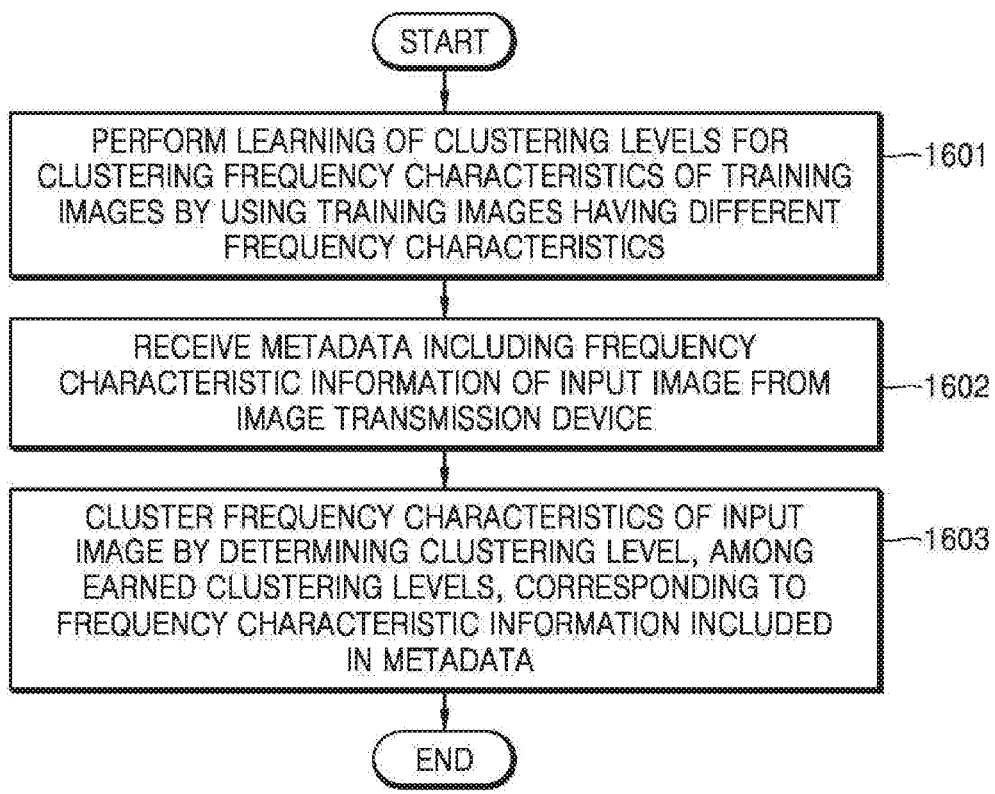
FIG. 16 is a flowchart of a method of analyzing frequency characteristics of an input image, performed by an image receiving device, according to an embodiment.

FIG. 16 is a flowchart of a method of analyzing frequency characteristics of an input image, performed by an image receiving device, according to an embodiment. Referring to FIG. 16, the method of analyzing frequency characteristics of an input image includes operations performed by the image receiving device 20 of FIG. 12 in a sequential manner. Thus, although not described below, the description with reference to the figures preceding FIG. 16 is also applicable to the method of FIG. 16.

In operation S1601, the frequency characteristics classifier 210 performs learning of clustering levels for clustering frequency characteristics of training images 1201 by using the training images 1201, the training images 1201 having different frequency characteristics.

In operation S1602, the receiver 220 receives metadata including frequency characteristic information of an input image from an image transmission device (the image processing device 10). As described above, the metadata is generated by the image transmission device (the image processing device 10) and includes frequency characteristic information generated based on band values of frequency bands determined using a frequency band pattern with respect to frequency coefficients converted from the input image. In this case, the metadata may include frequency characteristic information representing scalar values corresponding to frequency characteristics of the input image or a distribution of the scalar values.

In operation S1603, the frequency characteristics classifier 210 clusters the frequency characteristics of the input image by determining a clustering level corresponding to the frequency characteristic information included in the metadata among the learned clustering levels. In this case, the frequency characteristics classifier 210 may perform learning of the clustering levels by using the multi-class SVM and the clustering levels may correspond to hyperplanes determined by the multi-class SVM, but embodiments are not limited thereto. The learned clustering levels may include a clustering level for performing clustering to a high-frequency image, a clustering level for performing clustering to a mid-frequency image, and a clustering level for performing clustering to a low-frequency image.

The above-described methods can be embodied as a computer program. The computer program may be stored in a computer readable recording medium, and executed on a general-purpose digital computer. A data structure used in the methods may be recorded on a computer-readable recording medium through various means. Examples of the computer-readable recording medium include storage media such as a magnetic recording medium (a ROM, a floppy disc, a hard disc, etc.) and an optical recording medium (a CD-ROM, a DVD, etc.).

It will be understood by those of ordinary skill in the art that various changes in form and details may be made in the present embodiments without departing from the spirit and scope of the invention as defined by the appended claims. Thus, the exemplary embodiments should be considered in descriptive sense only and not for purposes of limitation. The scope of the invention is defined not by the detailed description of the invention but by the appended claims, and all differences within the scope will be construed as being included in the present invention.

The invention claimed is:

1. A method of generating metadata including frequency characteristic information of an image, the method comprising:
converting pixel values of a current block among blocks divided from the image into frequency coefficients in a frequency domain;
determining, for each of regions of the current block, a band value of a frequency band corresponding to a respective region of the regions of the current block by using the frequency coefficients included in the regions of the current block, the regions of the current block being divided to correspond to different frequency bands; and
generating the metadata including the frequency characteristic information of the current block based on the band value of the frequency band, for each of the regions of the current block, corresponding to the respective region of the current block, wherein the metadata is saved with image data of the image.

2. The method of claim 1, wherein the regions of the current block comprise m regions which are set according to a predetermined frequency band pattern for dividing the frequency coefficients included in the current block into m frequency bands, wherein m is a natural number.

3. The method of claim 2, wherein the frequency band pattern has a size of N×N when the current block has an N×N pixel array size, wherein N is a natural number.

4. The method of claim 2, wherein the frequency coefficients comprise discrete cosine transform (DCT) coefficients generated by performing DCT on the pixel values,
wherein the frequency band pattern divides the current block into the m regions corresponding to the m frequency bands in a diagonal direction crossing a direct-current (DC) coefficient of a low-frequency component and an alternating-current (AC) coefficient which is a highest-frequency component among the DCT coefficients.

5. The method of claim 2, wherein the determining of the band value of the frequency band corresponding to the respective region of the regions of the current block comprises:
grouping the frequency coefficients of the current block into groups corresponding to the m frequency bands by using a predetermined frequency band pattern;
evaluating the frequency coefficients belonging to each of the groups; and
determining the band value of the frequency band, for each of the regions of the current block, based on a result of evaluating the frequency coefficients belonging to each of the groups.

6. The method of claim 5, wherein different threshold values of the frequency coefficients are allocated to the frequency bands, and
the evaluating of the frequency coefficients belonging to each of the groups comprises evaluating the frequency coefficients by comparing a statistic of the frequency coefficients belonging to each of the groups with a respective threshold value among the different threshold values allocated to a frequency band corresponding to each of the groups.

7. The method of claim 6, wherein the determining of the band value of the frequency band corresponding to the respective region of the regions of the current block comprises determining a band value of the frequency band corresponding to each of the groups to be '1' when a result of the comparing reveals that the statistic of the frequency coefficients belonging to each of the groups is greater than or equal to the respective threshold value allocated to the frequency band corresponding to each of the groups, and determining the band value of the frequency band corresponding to each of the groups to be '0' when the statistic of the frequency coefficients is less than the threshold value.

8. The method of claim 2, wherein, when the predetermined frequency band pattern includes m frequency bands, the determining of the band value of the frequency band corresponding to the respective region of the regions of the current block comprises generating an m-digit bit string having bits corresponding to m band values, and
frequency characteristics of the current block are expressed as values calculated from the m-digit bit string.

9. The method of claim 1, wherein the image is clustered to have frequency characteristics of one of a high-frequency image, a mid-frequency image, and a low-frequency image, based on a statistic of scalar values calculated with respect to each of the blocks.

10. The method of claim 9, wherein the metadata is generated by an image transmission device which transmits the image and transmitted together with the image from the image transmission device to an image receiving device which reproduces the image, and
the image is clustered by at least one of the image transmission device and the image receiving device.

11. A device for generating metadata including frequency characteristic information of an image, the device comprising;
a frequency converter configured to convert pixel values of a current block among blocks divided from the image into frequency coefficients in a frequency domain;
a frequency characteristics analyzer configured to determine, for each of regions of the current block, a band value of a frequency band corresponding to a respective region of the regions of the current block by using the frequency coefficients included in the regions of the current block, the regions of the current block being divided to correspond to different frequency bands; and
a metadata generator configured to generate the metadata including the frequency characteristic information of the current block based on the band value of the frequency band, for each of the regions of the current block, corresponding to the respective region of the current block, wherein the metadata is saved with image data of the image.

12. The device of claim 11, wherein the regions of the current block comprise m regions which are set according to a predetermined frequency band pattern for dividing the frequency coefficients included in the current block into m frequency bands, wherein m is a natural number.

13. The device of claim 12, wherein the frequency band pattern has a size of N×N when the current block has an N×N pixel array size, wherein N is a natural number.

14. The device of claim 12, wherein the frequency coefficients comprise discrete cosine transform (DCT) coefficients generated by performing DCT on the pixel values,
wherein the frequency band pattern is used to divide the current block into the m regions corresponding to the m frequency bands in a diagonal direction crossing a direct-current (DC) coefficient of a low-frequency component and an alternating-current (AC) coefficient which is a highest-frequency component among the DCT coefficients.

15. The device of claim 12, wherein the frequency characteristics analyzer is configured to group the frequency coefficients of the current block into groups corresponding to m frequency bands by using a predetermined frequency band pattern, to evaluate the frequency coefficients belonging to each of the groups, and to determine the band value of the frequency band, for each of the regions of the current block, based on a result of evaluating the frequency coefficients belonging to each of the groups.

16. The device of claim 15, wherein different threshold values of the frequency coefficients are allocated to the frequency bands, and
the frequency characteristics analyzer is configured to evaluate the frequency coefficients by comparing a statistic of the frequency coefficients belonging to each of the groups with a respective threshold value among the different threshold values allocated to a frequency band corresponding to each of the groups.

17. The device of claim 16, wherein the frequency characteristics analyzer is configured to determine a band value of the frequency band corresponding to each of the groups to be '1' when a result of the comparing reveals that the statistic of the frequency coefficients belonging to each of the groups is greater than or equal to the respective threshold value allocated to the frequency band corresponding to each of the groups, and to determine the band value of the frequency band corresponding to each of the groups to be '0' when the result of the comparing reveals that the statistic of the frequency coefficients is less than the threshold value.

18. The device of claim 12, wherein, when the predetermined frequency band pattern includes m frequency bands, the frequency characteristics analyzer is configured to generate an m-digit bit string having bits corresponding to m band values, and frequency characteristics of the current block are expressed as values calculated from the m-digit bit string.

19. The device of claim 11, wherein the image is clustered to have frequency characteristics of one of a high-frequency image, a mid-frequency image, and a low-frequency image, based on a statistic of scalar values calculated with respect to each of the blocks, and the device is an image transmission device which transmits the image, the metadata is transmitted together with the image from the image transmission device to an image receiving device which reproduces the image, and the image is clustered by at least one of the image transmission device and the image receiving device.

20. A non-transitory computer-readable recording medium having recorded thereon a program for performing in a computer the method of claim 1.

* * * * *